(12) United States Patent
Smith

(10) Patent No.: US 8,721,881 B1
(45) Date of Patent: May 13, 2014

(54) POOL SKIMMER BASKET SYSTEM

(71) Applicant: Totally New Technologies LLC, Goodlettsville, TN (US)

(72) Inventor: Ronnie E Smith, Goodlettsville, TN (US)

(73) Assignee: Totally New Technologies LLC, Goodlettsville, TN (US)

( * ) Notice: Subject to any disclaimer, the term of this patent is extended or adjusted under 35 U.S.C. 154(b) by 0 days.

(21) Appl. No.: 14/023,415

(22) Filed: Sep. 10, 2013

(51) Int. Cl.
*E04H 4/12* (2006.01)

(52) U.S. Cl.
CPC .................................. *E04H 4/1272* (2013.01)
USPC ....................................... 210/167.1; 210/232

(58) Field of Classification Search
USPC ................... 210/167.1, 167.12, 167.19, 232
See application file for complete search history.

(56) References Cited

U.S. PATENT DOCUMENTS

| | | | |
|---|---|---|---|
| 2,989,185 A | | 6/1961 | Lombardi |
| 3,428,178 A | * | 2/1969 | Nash .............................. 210/121 |
| 4,325,150 A | | 4/1982 | Buddy |
| 4,737,279 A | | 4/1988 | Lewis |
| 4,746,424 A | | 5/1988 | Drew |
| 4,820,411 A | | 4/1989 | Lempio |
| 5,413,707 A | | 5/1995 | Shatilov |
| 5,830,350 A | | 11/1998 | Voss |
| 6,187,181 B1 | | 2/2001 | Stoltz |
| 6,592,756 B1 | | 7/2003 | Felix, Jr. |
| 6,716,342 B1 | | 4/2004 | Tilsner |
| 8,202,416 B1 | | 6/2012 | Jones |
| 8,382,977 B1 | | 2/2013 | Jones |
| 2008/0099387 A1 | * | 5/2008 | Pellington et al. ......... 210/167.1 |
| 2013/0043185 A1 | | 2/2013 | Iacovacci |

OTHER PUBLICATIONS

Print out of Support Ring for Hayward Pool Skimmer Baskets, as sold by Inyopools.com. Available at http://www.inyopools.com/Products/07501352024818.htm (last accessed Feb. 17, 2014).

* cited by examiner

*Primary Examiner* — Fred Prince
(74) *Attorney, Agent, or Firm* — Shane V. Cortesi

(57) ABSTRACT

The present invention relates to apparatuses for improving pool skimmers. In some embodiments, the apparatus is a pool skimmer basket system that includes a skimmer basket, a first tube that is attached to the skimmer basket, and a second tube that is adjacent to and rotatable relative to the first tube. The first tube includes a longitudinal slot that feeds water into the skimmer basket. Without being bound by any particular theory, it is believed that the slot increases the velocity of water flowing into the basket and that the system increases the debris-holding capacity and allows one to avoid having to reach through dirty water to remove the skimmer basket.

30 Claims, 29 Drawing Sheets

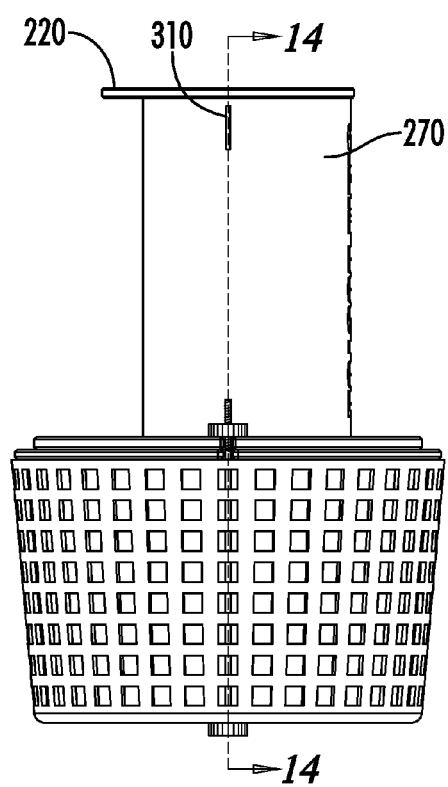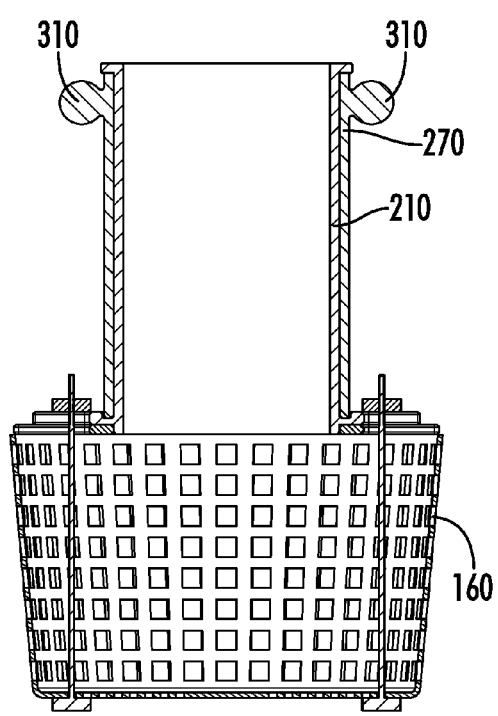
FIG. 13
FIG. 14

POOL SKIMMER BASKET SYSTEM

BACKGROUND

Technical Field

The present invention relates to apparatuses for improving the operation of pool skimmers, particularly those used in swimming pools, and methods of using the same.

BACKGROUND OF THE INVENTION

With reference to FIGS. 1-3, in the prior art, it is known to remove debris in swimming pools 110 through the use of skimmers 100. Skimmers 100 generally include a rectangular skimmer opening 135 located in a sidewall 120 of the swimming pool 110, a moveable weir 170 that pivots on a hinge 155 within the skimmer 100 and moves in response to changes in the water levels of the swimming pool 110, and a skimmer basket 160. The skimmer basket 160 sits in a well 198 located in the interior 137 of the skimmer 100, collects debris and must be emptied.

Water enters the skimmer 100 through the opening 135, flows through water passageway 196 and over the weir 170, and through the skimmer basket 160. Ultimately, the filtered water is then pumped back into the swimming pool 110 through water jets 175 located in the pool sidewalls 120 using a pump 190 and a series of pipes 180, 181, 182 and 193. The capacity of pool pumps 190 is usually provided in gallons per minute (gpm), which refers to the amount of water that the pump 190 is able to circulate in a minute. The pump 190 is usually connected to a pool drain 195 in addition to the skimmer 100, and in some cases the pool owner is able to adjust the rate at which the pump 190 pulls water into the skimmer 100 by closing the drain valve 194. However, closing the drain valve 194 requires manual intervention by the pool owner.

Unfortunately, swimming pool skimmers 100 have a number of problems. First, skimmer baskets 160 fill up quickly, particularly in residential areas with many trees. Thus, skimmer baskets 160 are a constant maintenance issue. Second, skimmer baskets 160 are often located more than six inches below the top access opening 197 to the skimmer 100, which means that the pool owner has to dip his or her hands into dirty water to reach the skimmer basket 160. This is particularly unappealing since creatures like snails and spiders are attracted to skimmers 110. Third, many swimming pool pumps 190 lack sufficient suction force due to safety requirements such as the Virginia Graeme Baker Pool and Spa Safety Act in the United States. Consequently, too often debris water is sucked into the skimmer 100 at too low of a rate, leaving the pool 110 dirty. Finally, skimmer baskets 160 are often provided with a plastic handle 166 so that they may be emptied. However, when a large amount of water-logged, heavy debris is located above the handle 166, the pump 190 sucks the water-logged debris against the handle 166, leading the handle 166 to snap (break). This is especially problematic in the case of cheap plastic baskets 160 with weak handles 166.

Attempts have been made in the prior art to address some of these issues. For example, U.S. Pat. No. 8,202,416 teaches a diverter plate that replaces the existing weir 170 and consists of two parts that move into the skimmer 100. Although the diverter plate of the '416 patent claims to increase suction power, it does nothing to address the lack of capacity of the skimmer basket 160, the fact that a pool owner has to dip his or her hands into dirty water to remove the skimmer basket 160, or breakage of basket handles 166.

U.S. Pat. No. 5,830,350 teaches a vented tower that extends from the floor 161 of the skimmer basket 160 and seeks to address a particular problem associated with the skimmer basket 160, namely, the basket 160 being sucked to the skimmer well 198 by the pump 190. The '350 patent does nothing to address the small capacity of the skimmer basket 160, as the vents in the tower are air vents. The '350 patent also does not address the flow rate of water into the basket 160.

Skimmer baskets with floating weirs have also been developed, as described in for example U.S. Pat. Nos. 6,716,342 and 4,325,150. These baskets are designed to prevent water from flowing back into the pool 110 from the skimmer 100 and are not designed to increase basket 160 capacity, make the basket 160 easier to grab, or to increase the velocity of water and debris entering the basket 160.

Finally, U.S. Pat. No. 4,737,279 ("the '279 patent") teaches an apparatus that sits on top of a skimmer basket and has two flow paths, one via a coupling for a suction hose and the other via a weir-gated enclosure carried by the basket closure. The '279 patent does not teach or suggest a system that has an inner and outer tube that are attached to a skimmer basket. The '279 patent also teaches that the proper position of the apparatus is the position in which the open weir gated side of the enclosure faces toward the skimmer throat. See Column 8, Lines 37-40; FIG. 1.

Thus, there is a need for cheap and safe devices that improve the operation of swimming pool skimmers.

BRIEF SUMMARY

The present invention relates to apparatuses for improving pool skimmers. In some embodiments, the apparatus is a pool skimmer basket system that includes a skimmer basket, a first tube, and a second tube. More particularly, in some embodiments, the system includes a skimmer basket, the skimmer basket configured to be placed in a pool skimmer and comprising a basket interior, a basket exterior, a floor, a top/rim, a height extending from the floor to the top/rim, a sidewall extending upwardly from the floor, and a plurality of apertures located in at least one of the basket sidewall and the floor (i.e., in the sidewall and/or floor), wherein the basket floor and the basket sidewall separate the basket interior from the basket exterior; a first tube attached to the skimmer basket, the first tube comprising a top, a bottom comprising an opening, a first tube height extending from the bottom to the top, an interior, an exterior comprising a first flange extending from the first tube towards the basket sidewall, and a first tube slot configured to feed water from the first tube exterior to the first tube interior and ultimately the basket interior, the first tube slot located between the top and the bottom of the first tube, the first tube slot having a width perpendicular to the first tube height and a height parallel to the first tube height; and a second tube adjacent to the first tube and rotatable relative to the first tube, the second tube comprising a top, a bottom, a second tube height extending from the bottom to the top, and a second tube slot located between the top and the bottom of the second tube, the second tube slot having a width perpendicular to the second tube height and a height parallel to the second tube height.

Optionally, the tops of the first and second tubes each comprise openings. Optionally, the first tube is located inside the second tube interior. Optionally, the system further includes a pool, the pool comprising a sidewall, the pool sidewall comprising a pool skimmer, the pool skimmer comprising a skimmer interior and a skimmer opening leading from the pool to the skimmer interior and further wherein the basket is located in the skimmer interior. Optionally, the widthwise center of the first tube slot is offset from the widthwise center of the skimmer opening by at least about 30 degrees. Optionally, the first flange and the skimmer basket are permanently attached to each other. Optionally, the first flange and the skimmer basket are mechanically/removably attached to each other. Optionally, the first flange is pivotally attached to the skimmer basket by a hinge. Optionally, the first flange is removably attached to the skimmer basket by a fastener. Optionally, the fastener is at least about 3 inches in length and comprises threads. Optionally, the first flange comprises a first fastener aperture and the fastener passes through the first fastener aperture. Optionally, the first fastener aperture substantially extends to an outer edge of the first flange. Optionally, the fastener passes through an aperture in the basket. Optionally, the first flange and the basket comprise mating threads for removably attaching the first flange to the basket. Optionally, the width of the first tube slot is at least about 1 inch, the width of the second tube slot is at least about 1 inch, the height of the first tube slot is at least about 4 inches and the height of the second tube slot is at least about 4 inches. Optionally, the first tube and the second tube are generally cylindrical. Optionally, the first tube height is greater than the second tube height, the second tube is located above the first flange and the first tube comprises an upper flange that extends about a circumference of the first tube, the upper flange located above the first flange and the second tube. Optionally, the first flange comprises a groove that is adjacent to the first tube, is located on the top surface of the first flange, and extends about a perimeter of the first tube, and the bottom of the second tube is located in the groove. Optionally, the first tube slot comprises a top and a bottom, and the bottom of the first tube slot is adjacent to a top of the first flange. Optionally, the system further comprises a washer attached to the first flange, the washer comprising a washer opening in fluid communication with the first tube bottom aperture. Optionally, the washer comprises a fastener slot configured to receive a fastener and the washer extends beyond a perimeter of the first flange. Optionally, the first tube slot extends from the first flange to the top of the first tube. Optionally, the first tube is immobile relative to the first flange and the basket. Optionally, the first tube, second tube, and first flange are comprised of plastic. Optionally, the width of the first tube slot is approximately equal to the width of the second tube slot. For example, the width of the first tube slot may be between about 90% and about 110% of the width of the second tube slot. Optionally, the interior of the first tube is hollow. Optionally, the first tube is located above the basket floor. Optionally, the height of the first tube is different than the height of the second tube. Optionally, the second tube comprises at least one additional aperture between the top and the bottom of the second tube, the at least one additional aperture generally opposite the second tube slot. Optionally, the first flange is adjacent to the top of the skimmer basket. Optionally, the first tube extends above and below the first flange. Optionally, the first flange is configured to inhibit (but not necessarily prevent) water from entering the basket without first entering the slot of the first tube. Optionally, the first tube height is at least about 4 inches. Optionally, the bottom of the basket is substantially flat. Optionally, the first tube is configured to increase the velocity of water (e.g., create a vortex) entering into the basket when the basket is placed in a swimming pool skimmer and the swimming pool skimmer is connected to a pump.

Optionally, the system is provided as a kit that includes a first tube, the first tube comprising a top, a bottom comprising an opening, a height extending from the bottom to the top, an interior, an exterior, an inner diameter perpendicular to the height, an outer diameter perpendicular to the height, a first tube slot having a width of at least about 1 inch and a height of at least about 4 inches, the first tube slot width parallel to the inner and outer diameters, the first tube slot height perpendicular to the first tube inner and outer diameters, the first tube exterior comprising a first flange extending from the first tube, the first flange configured to attach to a skimmer basket, at least one of the first tube (e.g., the wall forming the first tube or a ledge extending from the interior surface of the wall) and the first flange comprising a plurality of fastener apertures for attaching the first tube to a skimmer basket; and a second tube, the second tube comprising a top, a bottom comprising a bottom aperture, a height extending from the bottom to the top, an interior, an exterior, an inner diameter perpendicular to said height, an outer diameter perpendicular to said height, and a second tube slot having a width of at least about 1 inch and a height of at least about 4 inches, the second tube slot width parallel to the second tube inner and outer diameters, the second tube slot height perpendicular to the second tube inner and outer diameters. Optionally, the inner diameter of the first tube is different than the inner diameter of the second tube and the outer diameter of the first tube is different than the outer diameter of the second tube. Optionally, the inner diameter of the second tube is substantially equal to the outer diameter of the first tube so that when the second tube is placed over the first tube, the second tube fits tightly on the first tube. Optionally, the first flange comprises a groove adjacent to the first tube and extending about an outer circumference of the first tube. Optionally, the kit further includes an upper flange extending about an outer circumference of the first tube. Optionally, the first flange substantially surrounds an outer circumference of the first tube. Optionally, the first tube is located between the fastener apertures. Optionally, the kit further includes a washer configured to attach to the first flange, the washer comprising a washer opening and the washer has a width/diameter of at least about 6 inches (e.g., about 6 inches to about 14 inches). Optionally, the washer comprises a fastener slot and the fastener slot substantially extends to an outer edge of the washer. Optionally, the kit further comprises two threaded fasteners, the fasteners each having a length of at least about 3 inches. Optionally, the interior of the first tube is hollow. Optionally, the tops of the first and second tube each comprise a top aperture.

In one particular embodiment, the system includes: a pool skimmer, the pool skimmer comprising a skimmer interior, a skimmer exterior, a skimmer opening leading from the skimmer exterior to the skimmer interior; a skimmer basket disposed in the pool skimmer interior, the skimmer basket comprising a basket interior, a basket exterior, a floor, a top/rim, a height extending from the floor to the top/rim, a sidewall extending upwardly from the floor, and at least one aperture located in at least one of the basket sidewall and the floor, wherein the basket floor and the basket sidewall separate the basket interior from the basket exterior; a first tube located above the skimmer basket, the first tube comprising a top, a bottom comprising an opening, a first tube height extending from the bottom to the top, an interior, an exterior, and a first tube slot configured to feed water from the first tube exterior to the first tube interior and ultimately the basket interior, the first tube slot located between the top and the bottom of the first tube, the first tube slot having a width perpendicular to the first tube height and a height parallel to the first tube height; and a door adjacent to the first tube, the door configured to move horizontally relative to the first tube and at least partially cover the first tube slot. In some embodiments, the door is a second tube, the second tube configured to rotate relative to the first tube and at least partially cover the first tube slot, the second tube comprising a top, a bottom, a second tube height extending from the bottom to the top, and a slot located between the top and the bottom of the second tube, the second tube slot having a width perpendicular to the second tube height and a height parallel to the second tube height. Optionally, the system further includes a pump in fluid communication with the skimmer basket, a pool and a pool sidewall and the skimmer is attached to, or located inside, the basket sidewall.

Preferably the system is used in a method of increasing the velocity of water flowing into a skimmer basket that includes a) providing the system and b) flowing water and debris through the slot of the second tube, through the slot of the first tube, into the first tube interior, and into the skimmer basket interior. Optionally, the method further includes rotating the second tube relative to the first tube. Optionally, the method further includes the step of rotating the second tube relative to the first tube so that the second tube partially covers the first tube slot, and rotation of the second tube relative to the first tube so that the second tube partially covers the first tube slot increases the velocity of water and debris entering the basket.

In yet another embodiment, the system includes a pool skimmer system comprising a pool skimmer, the pool skimmer comprising a skimmer interior, a skimmer exterior, a skimmer opening leading from the skimmer exterior to the skimmer interior, a skimmer basket well located in the skimmer interior, and a water passageway leading to the skimmer basket well, the water passageway having a height and a width; a skimmer basket disposed in the skimmer basket well, the skimmer basket comprising a basket interior, a basket exterior, a floor, a top/rim, a height extending from the floor to the top/rim a sidewall extending upwardly from the floor, and at least one aperture located in at least one of the basket sidewall and the floor, wherein the basket floor and the basket sidewall separate the basket interior from the basket exterior; a tube located above the skimmer basket, the tube comprising a top, a bottom comprising an opening, a tube height extending from the bottom to the top, an interior, an exterior, and a tube slot configured to feed water from the tube exterior to the tube interior and the basket interior, the tube slot located between the top and the bottom of the tube, the tube slot having a width perpendicular to the tube height and a height parallel to the tube height, the tube adjacent to the water passageway, the tube configured to rotate relative to the water passageway and at least partially cover the water passageway. Optionally, the tube is attached to the skimmer basket. Optionally, the system further includes a pump in fluid communication with the skimmer basket, a pool and a pool sidewall and the skimmer is attached to, or located inside, the basket sidewall. Optionally, the water passageway has a width of at least about 2 inches and a height of at least about 4 inches. Optionally, the tube is generally cylindrical. Optionally, the system further includes a weir located in the water passageway, the weir moveable between a vertical position in which the weir is parallel to the water passageway height and a horizontal position in which the weir is parallel to the water passageway width.

BRIEF DESCRIPTION OF THE DRAWINGS

FIG. 13 illustrates a side, elevation view of the assembled basket system of FIG. 9.

FIG. 14 illustrates a section view of the basket system of FIG. 13, taken along line 14-14.

in FIG. 28, one of the hinge pins has been removed so that the basket can pivot about the other hinge pin.

in FIG. 31, one of the hinge pins has been removed so that the basket can pivot about the other hinge pin.

in FIG. 33, the top access opening has been removed so that the basket system is visible.

DETAILED DESCRIPTION

Figure 1:
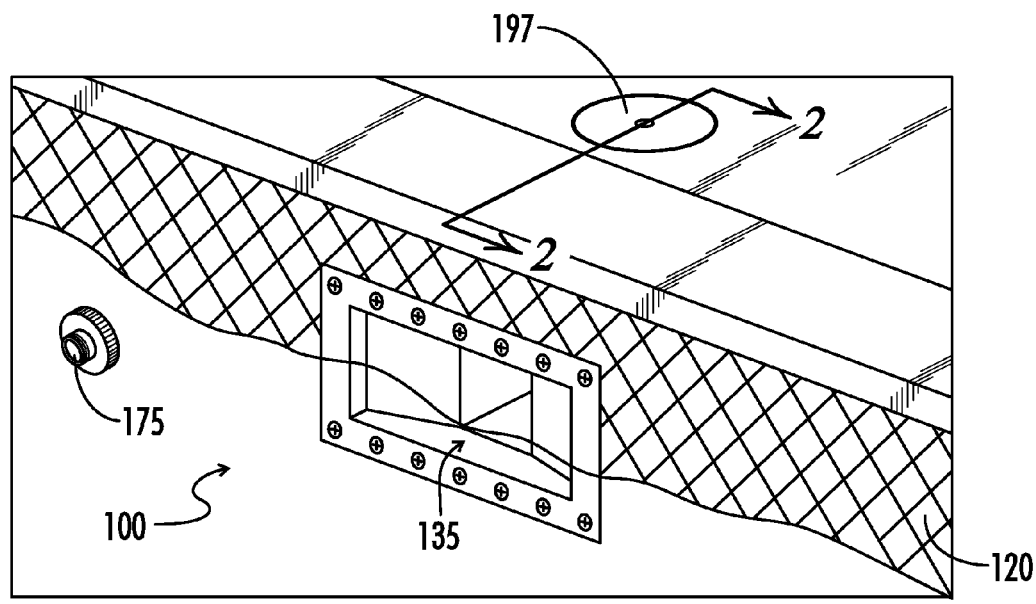
FIG. 1 illustrates a front, perspective view of a prior art skimmer and pool sidewall.
Figure 2:
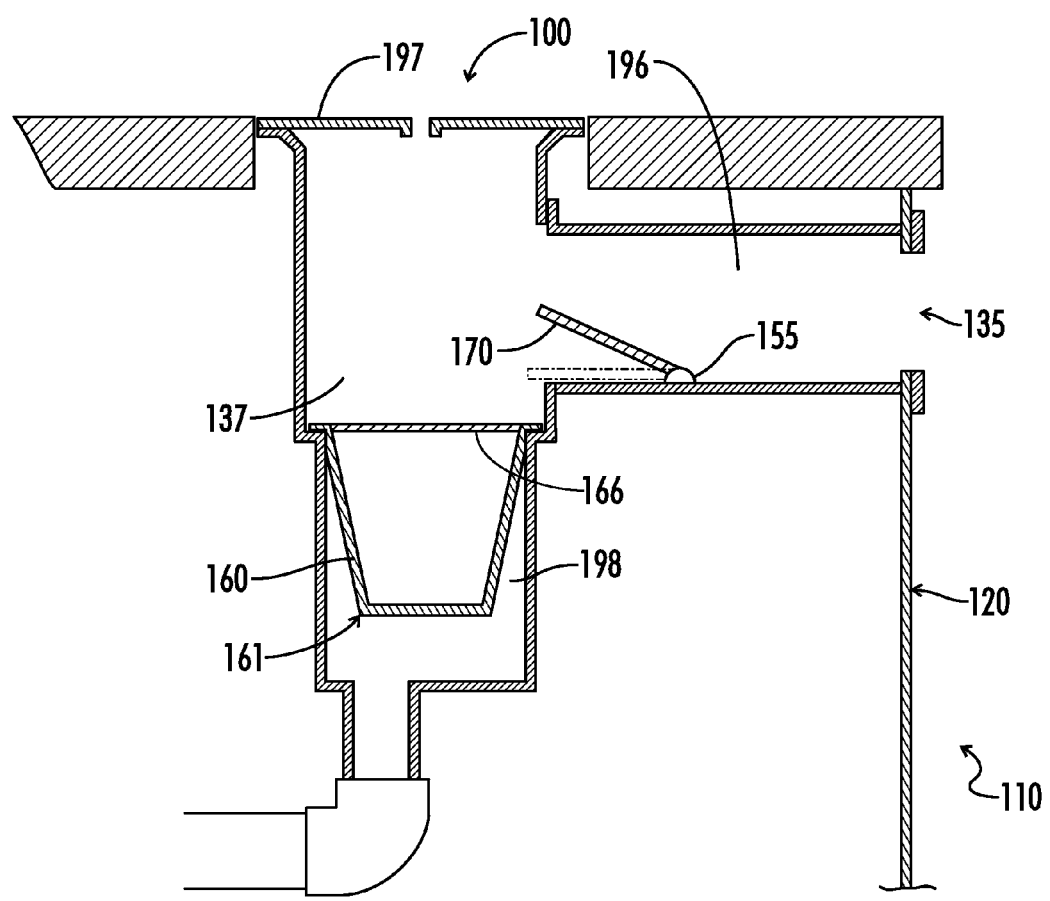
FIG. 2 illustrates a cross-sectional view of the prior art skimmer of FIG. 1, taken along line 2-2 of FIG. 1.
Figure 3:
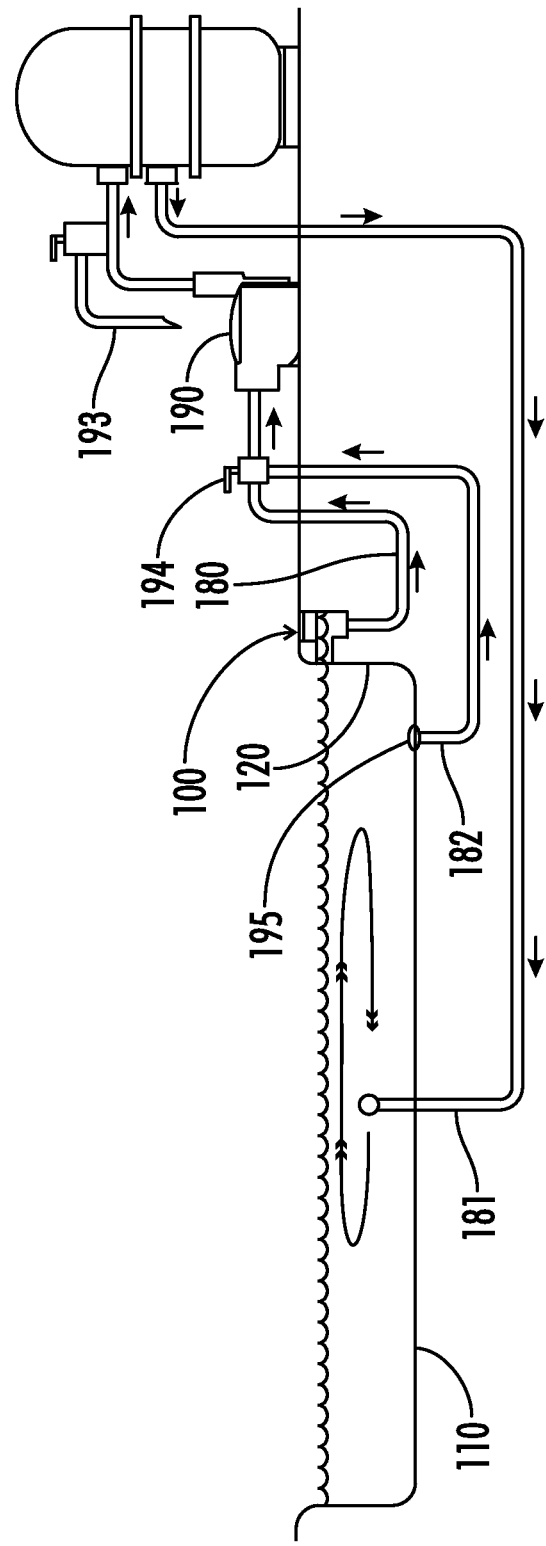
FIG. 3 illustrates a schematic view of water circulating in a clockwise fashion in a swimming pool with a prior art skimmer.
Figure 4:
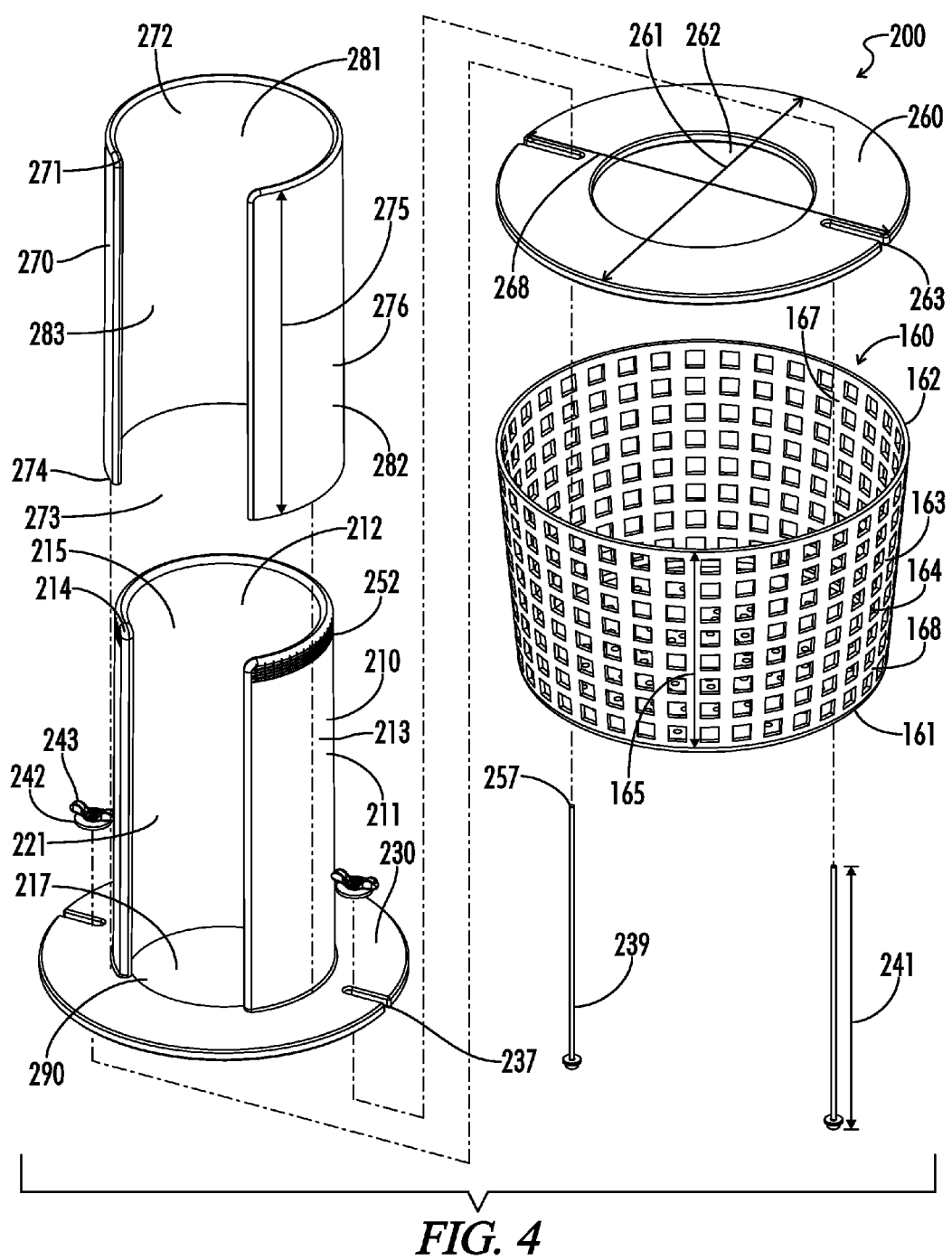
FIG. 4 illustrates a front, perspective, exploded view of a skimmer basket system of one embodiment of the present invention; in this embodiment, the first flange of the basket system is removably attached to the basket by a fastener.
Figure 5:
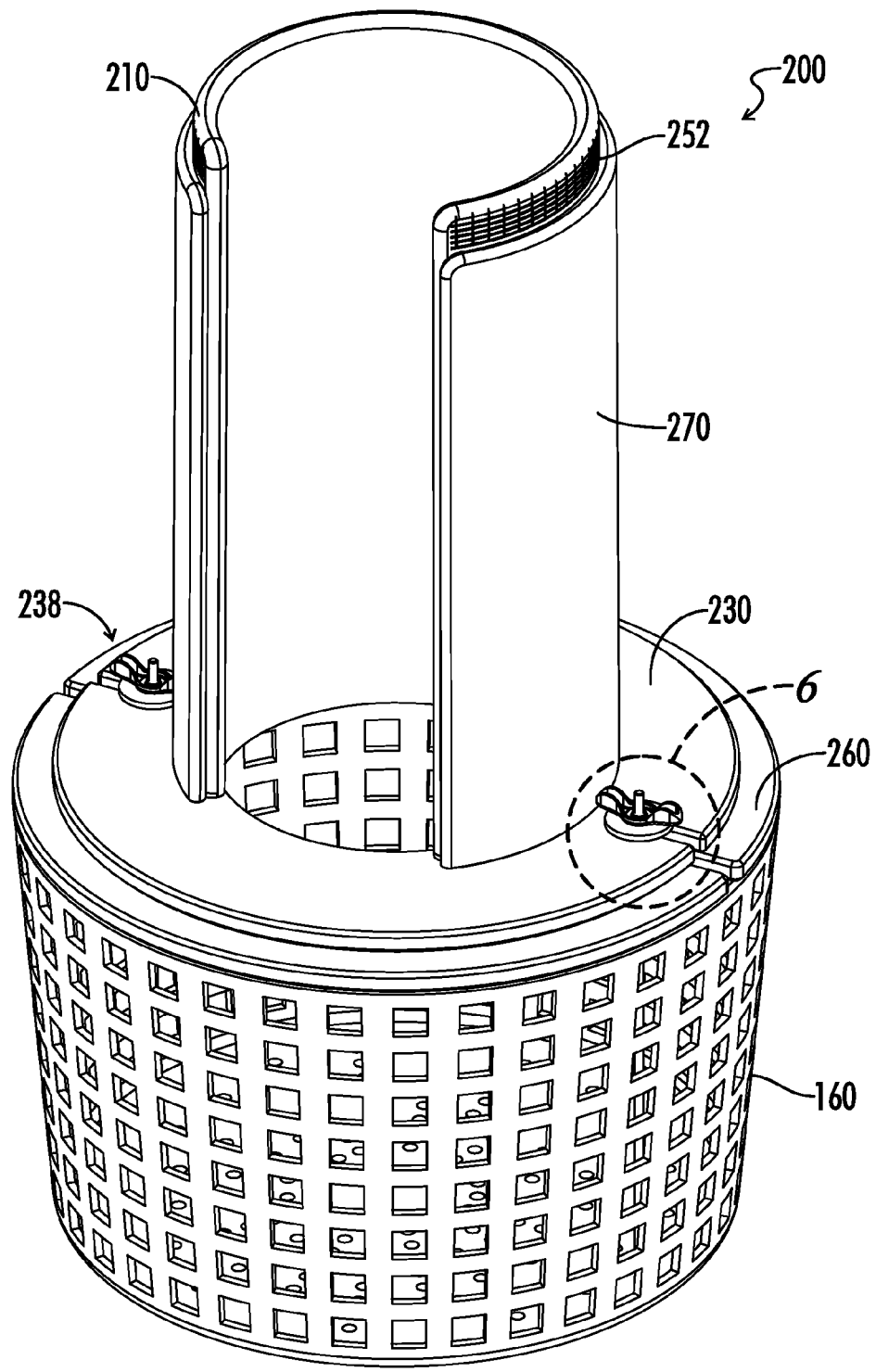
FIG. 5 illustrates a front, perspective view of the assembled basket system of FIG. 4.
Figure 6:
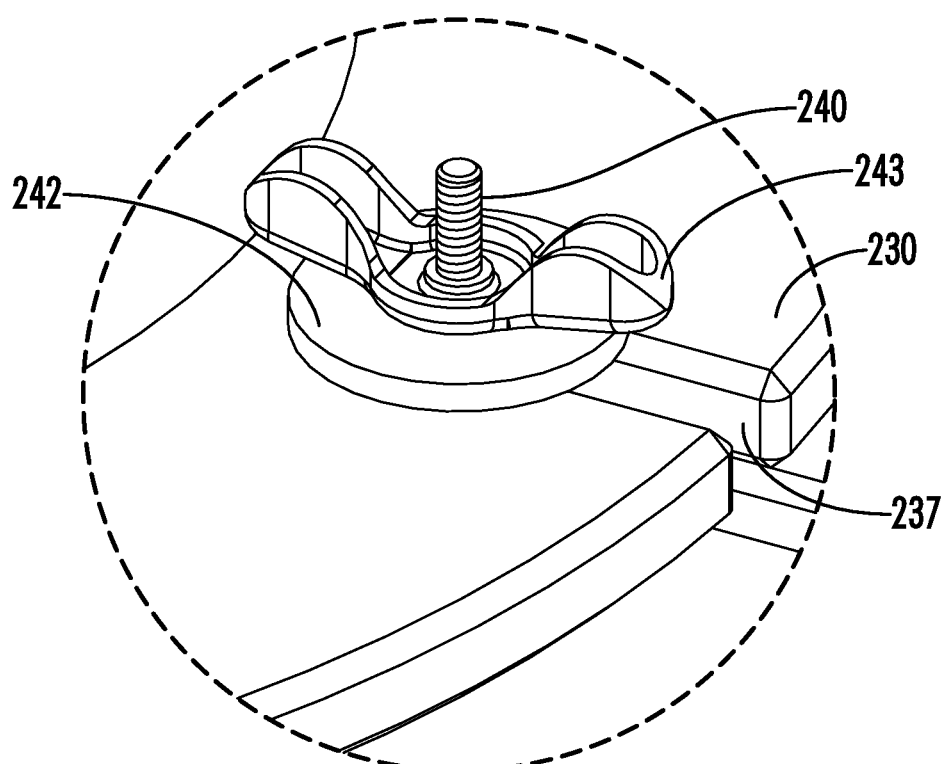
FIG. 6 illustrates a close-up, perspective view of the circled area of FIG. 5.
Figure 7:
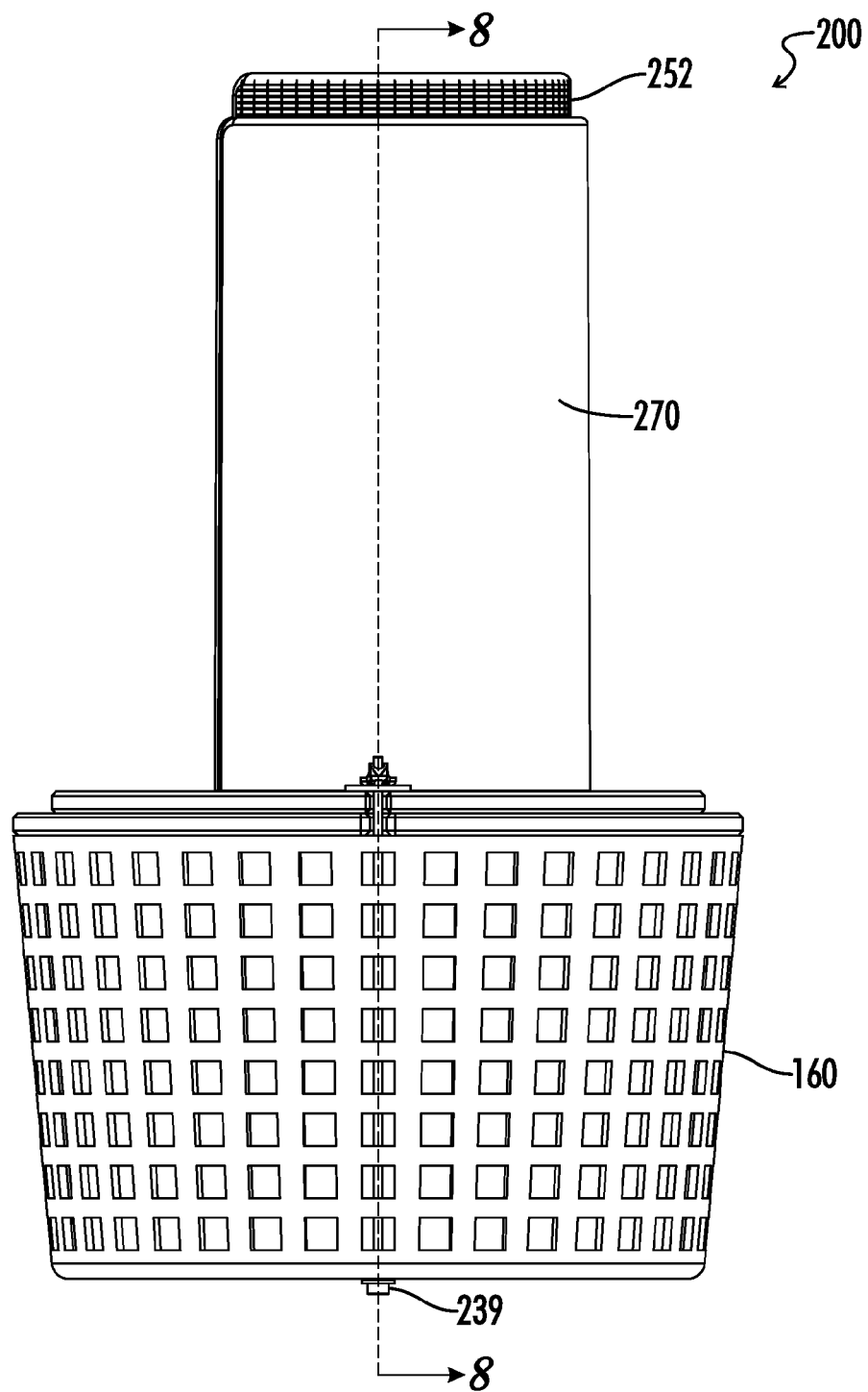
FIG. 7 illustrates a side, elevation view of the assembled basket system of FIG. 4.
Figure 8:
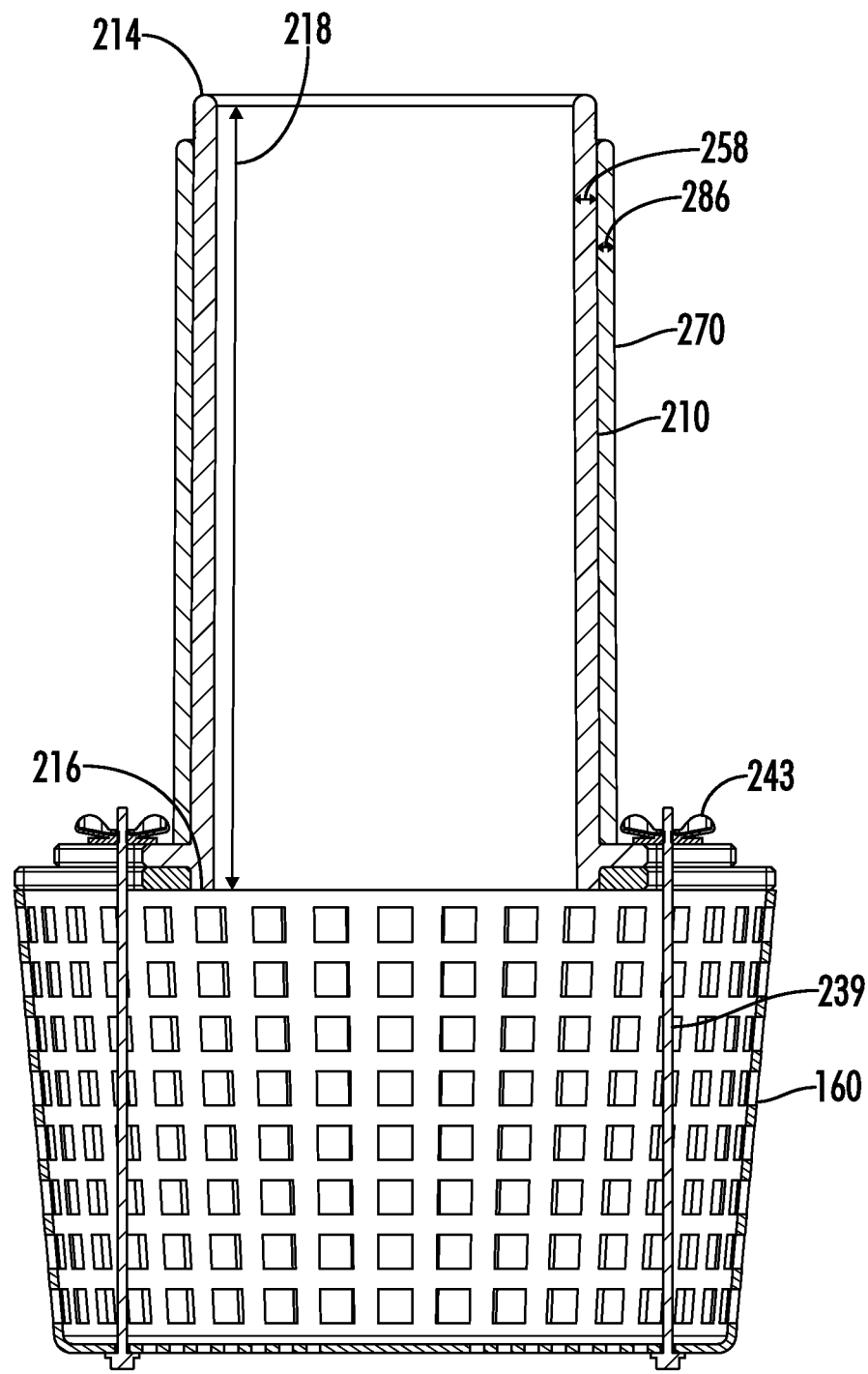
FIG. 8 illustrates a section view of the basket system of FIG. 7, taken along line 8-8.

The present disclosure provides a system 200 for improving a pool skimmer 100. In the drawings, not all reference numbers are included in each drawing for the sake of clarity. It will be understood that references herein to the singular form of a term encompass plural forms. The system 200 may be used in conjunction with any suitable pool skimmer, and are preferably used with immobile skimmers that are located in swimming pool, pond, fountain, or spa sidewalls, such as the skimmer 100 illustrated in FIGS. 1-3. As used herein, the term "pool" means a swimming pool, pond, fountain or spa. While, the system 200 may be used in spas, it will be appreciated that the system 200 is preferably used in swimming pools, given that spas generally have a small surface area and collect less debris than pools.

Referring further to the system 200, as shown in FIGS. 4-36 the system 200 includes a skimmer basket 160 configured to be placed in the interior 137 of a pool skimmer 100. The skimmer basket has a basket interior 167, a basket exterior 168, a floor 161, a top/rim 162, a height 165 extending from the floor 161 to the top/rim 162, one or more sidewalls 163 extending upwardly from the floor 161, and a plurality of apertures 164 located in the floor 161 and/or the sidewalls 163. The basket floor 161 and the basket sidewall 163 separate the basket interior 167 from the basket interior 168. In some embodiments, the basket 160 is generally cylindrical with the diameter of the cylinder decreasing from the top 162 to the floor 161 (e.g., a slight taper). In some embodiments, the basket floor 161 is substantially flat. However, the basket 160 can be any other suitable shape, such as rectangular. In some embodiments, the floor 161 is substantially flat.

The system 200 further includes a first tube 210 that, when the system 200 is fully assembled, optionally attaches to the skimmer basket 160 and is located above the basket floor 161. The first tube 210 optionally includes a wall 211 that forms the first tube 210, a top 214, a bottom 216 that includes a bottom opening 217, a first tube height 218 extending from the bottom 216 to the top 214, an interior 212, an exterior 213 that includes a first flange 230 extending from the wall 211 towards the basket sidewall 163, and a first tube longitudinal slot 221. In use, water and debris from the first tube exterior 213 enters the first tube interior 212 through the first tube longitudinal slot 221, flows through the bottom opening 217 and enters the basket interior 167. Optionally, the top 214 of the first tube 210 includes a top opening 215 so that water and debris may enter the inner tube interior 212 through the top opening 215 when water and debris are located above the top 214 of the first tube 210, which may occur when, for example, the water level in the skimmer 100 is particularly high. The first tube slot 221 preferably extends substantially the entire height 218 of the first tube 210. Preferably, the first tube height 218 is at least about 4 inches (e.g., about 4 inches to about 15 inches). Preferably, the first tube slot 221 has a width 222 perpendicular to the first tube height 218 and a height 224 parallel to the first tube height 218. In some embodiments, the first tube slot 221 has a width 222 of at least about 1 inch (more preferably about 2 to about 5 inches) and a height 224 of at least about 1 inch (more preferably about 4 inches to about 15 inches). Preferably, the first tube 210 is generally cylindrical and the first tube 210 has an inner diameter 255 (measured as the distance between opposing interior surfaces of the wall 211) and an outer diameter 254 (measured as the distance between opposing exterior surfaces of the wall 211) of at least about 2 inches (more preferably, about 3 inches to about 9 inches). In some embodiments, the first tube 210 is generally cylindrical with the inner and outer diameters 254 and 255 of the cylinder gradually increasing from the top 214 to the bottom 216 (e.g., a slight taper) to facilitate injection of the first tube 210 during plastic injection molding. The first tube wall 211 may have any desired thickness 258 depending on the strength desired and the cost of the material. In some embodiments, the first tube wall thickness 258 is from about 0.05 inches to about 2 inches. Optionally, the first tube 210 includes a knurled surface 252 at the top 214 of the first tube 210 for gripping. Preferably, the bottom 290 of the first tube slot 221 is adjacent to (more preferably about co-planar with) the top 231 of the first flange 230, as shown in FIGS. 4, 5, 8, 9, 10, 13-16, 18-24, 26, 29, 31 and 34. Preferably, the first tube slot 221 extends from the first flange 230 to the top 214 of the first tube 210. Preferably, the first tube 210 is immobile relative to the first flange 230.

Figure 19:
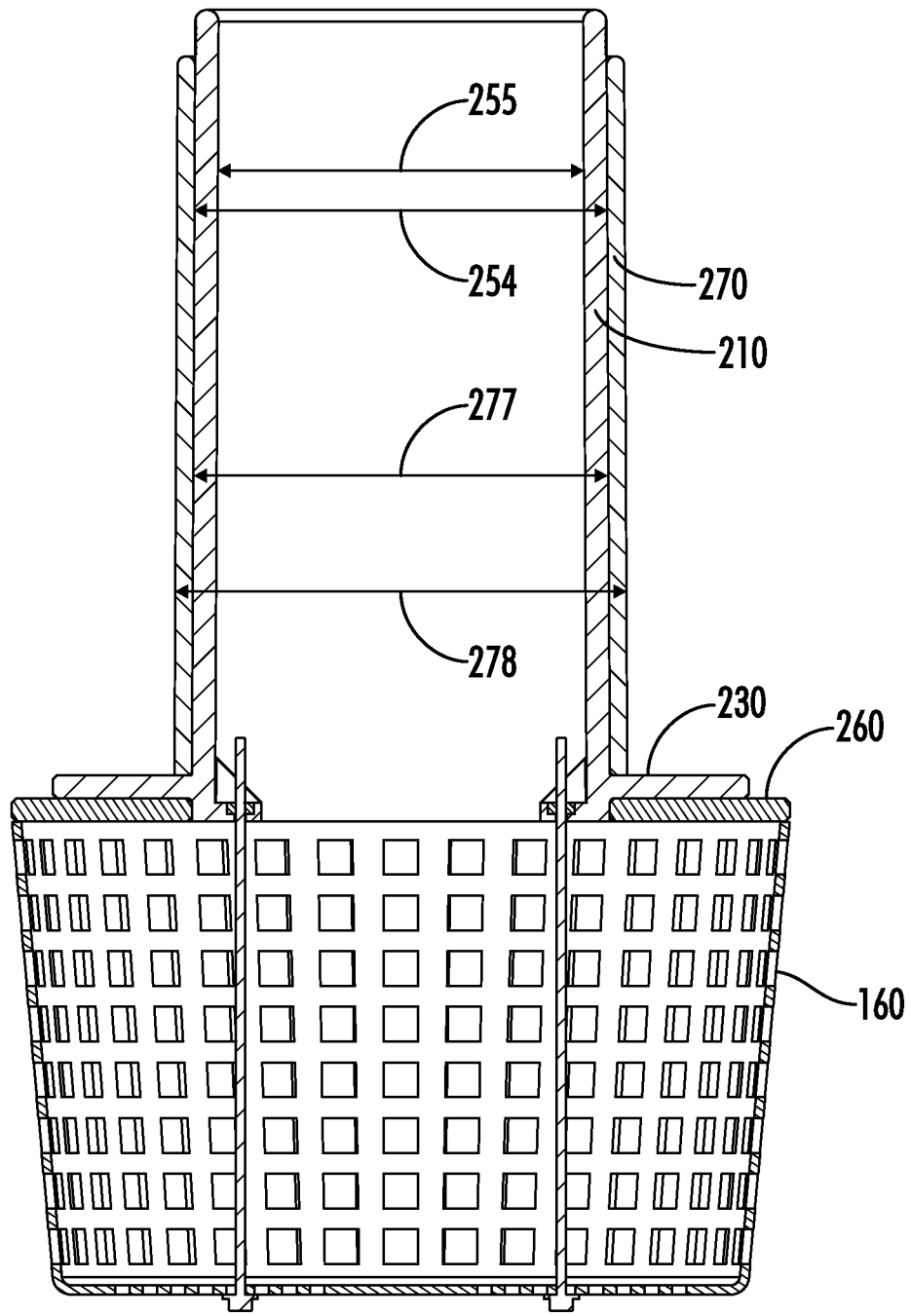
FIG. 19 illustrates a section view of the basket system of FIG. 18, taken along line 19-19.
Figure 25:
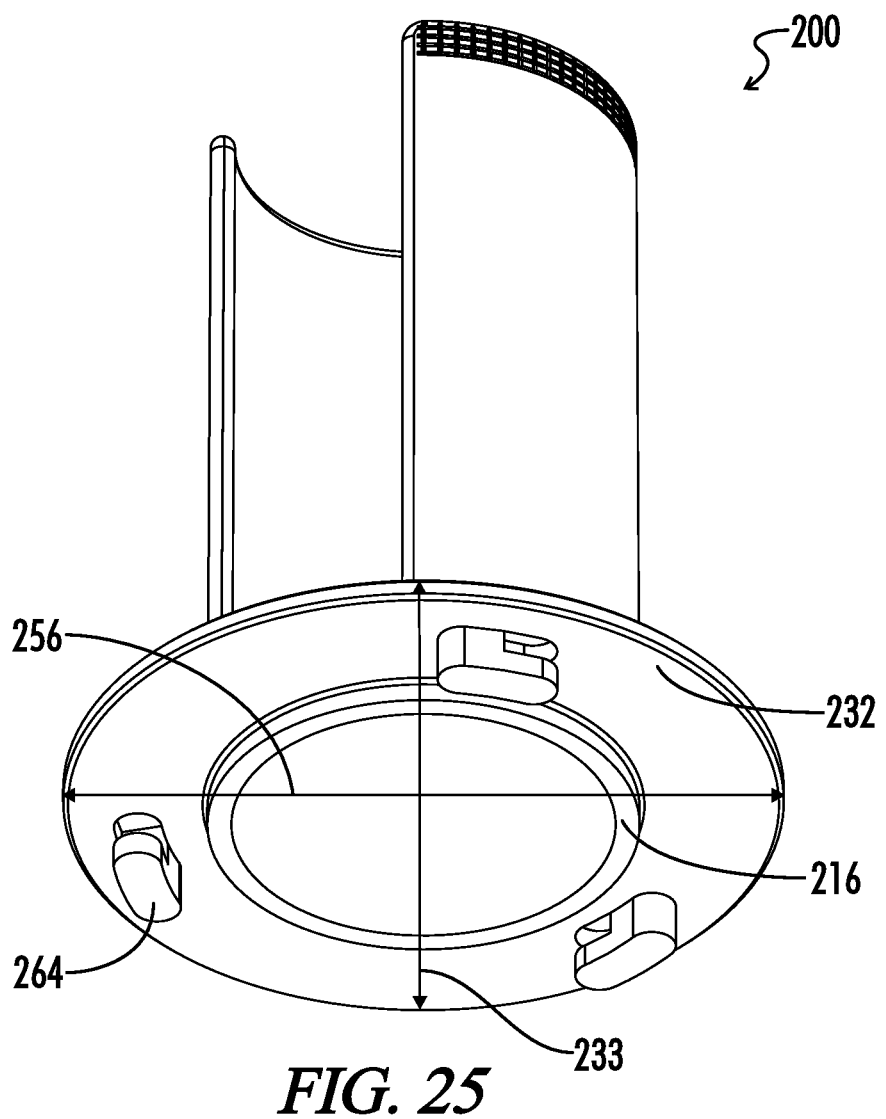
FIG. 25 illustrates a bottom view of the first flange and first tube of the basket system of FIG. 23.
Figure 26:
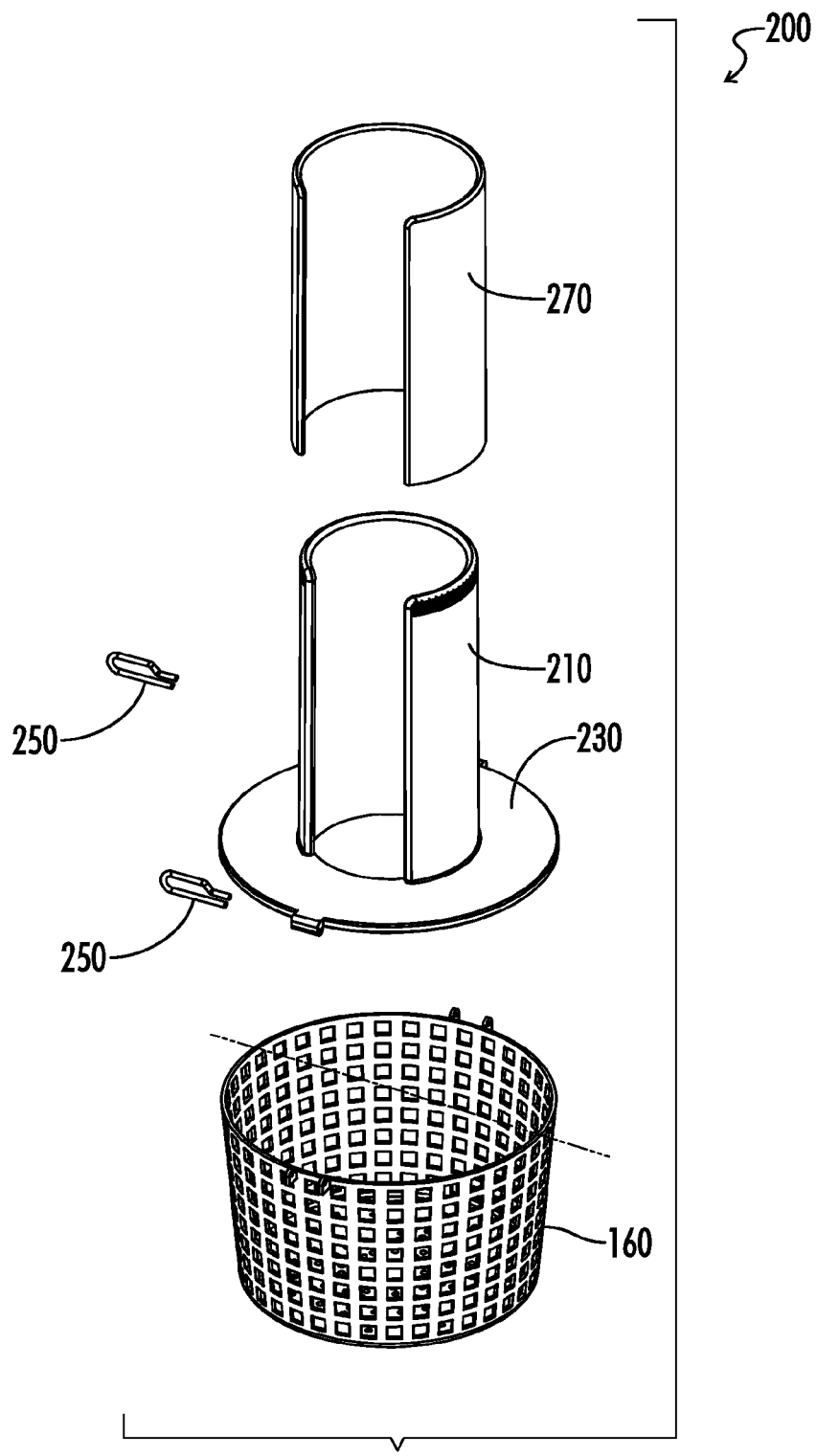
FIG. 26 illustrates a front, perspective, exploded view of a skimmer basket system of another embodiment of the present invention; in this embodiment, the first flange is attached to the basket via two hinges.
Figure 27:
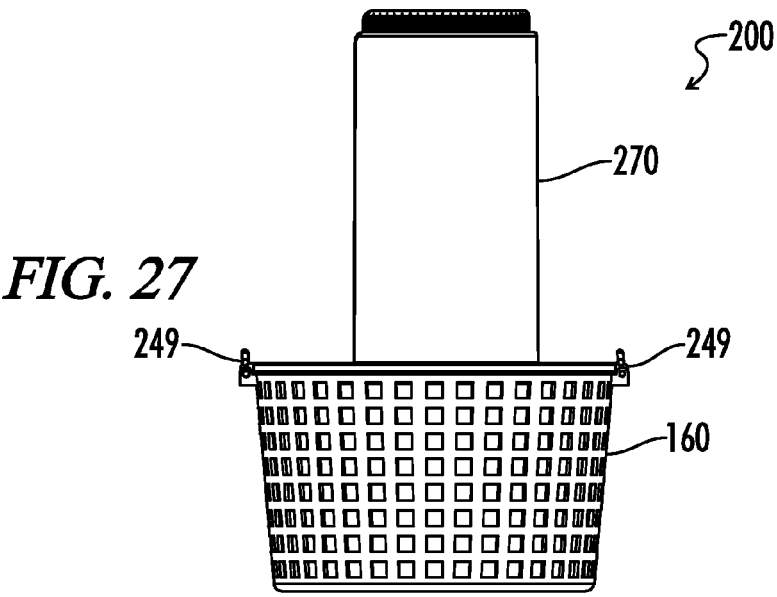
FIG. 27 illustrates a side, elevation view of the assembled basket system of FIG. 26.
Figure 28:
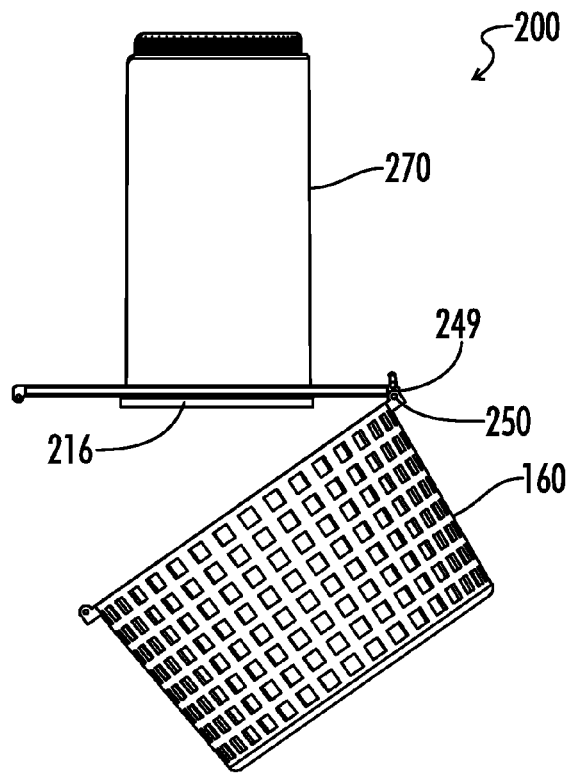
FIG. 28 illustrates a side, elevation view of the assembled basket system of FIG. 26.
Figure 29:
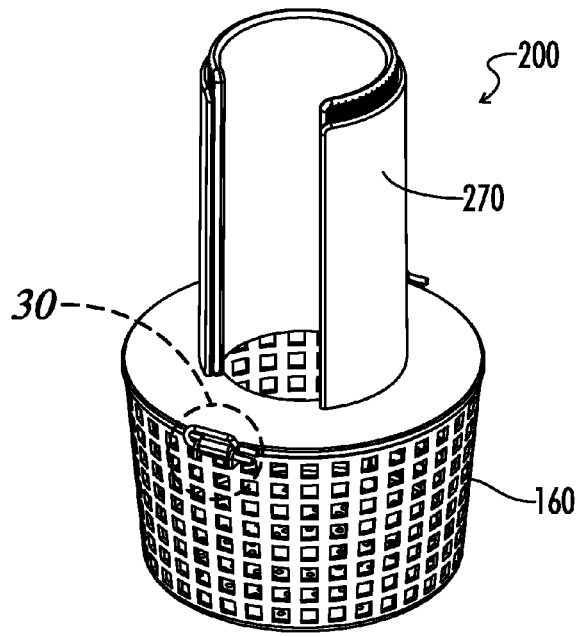
FIG. 29 illustrates a front, perspective view of the assembled basket system of FIG. 26.
Figure 30:
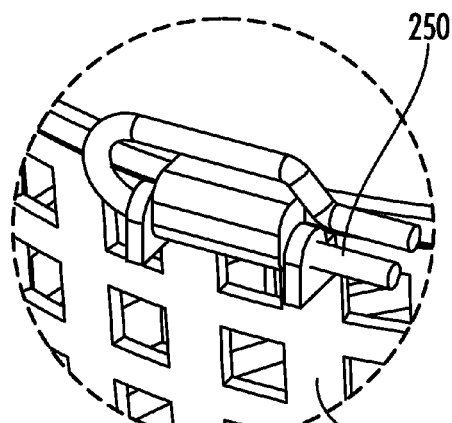
FIG. 30 illustrates a close-up, perspective view of the circled area of FIG. 29.
Figure 31:
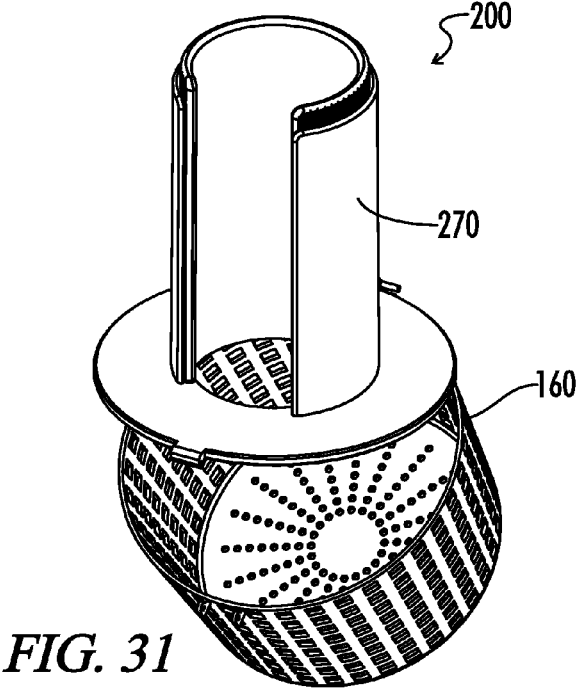
FIG. 31 illustrates a front, perspective view of the assembled basket system of FIG. 26.
Figure 32:
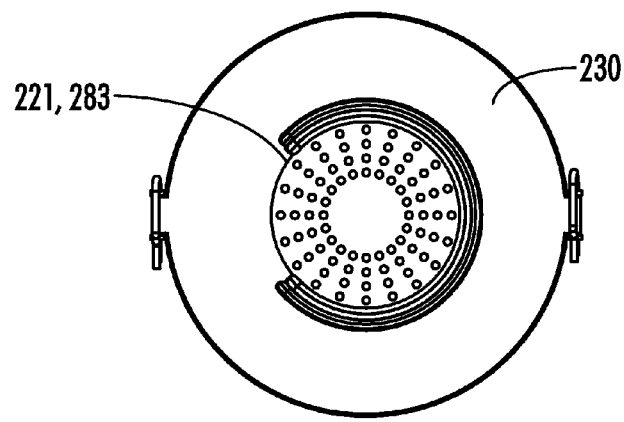
FIG. 32 illustrates a top view of the assembled basket system of FIG. 26.
Figure 33:
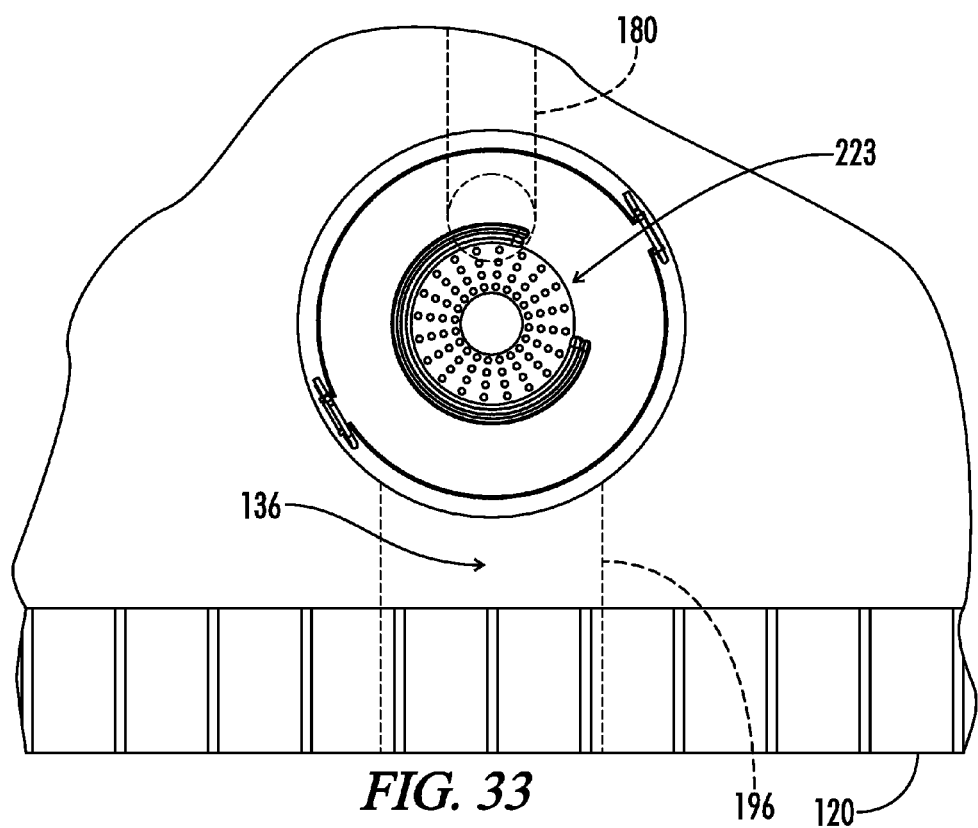
FIG. 33 illustrates a top view of a skimmer with the assembled basket system of FIG. 26.

In some embodiments, the first flange 230 is configured so that it alone, or in combination with a washer 260, inhibits (but does not necessarily prevents) water and debris from entering the basket 160 without first entering the slot 221 of the first tube 210. To accomplish this, the first flange 230 alone, or the first flange 230 and the washer 260, extends to or beyond the sidewall 163 of the basket 160 when the basket 160 is placed in the well 198 of the skimmer 100. The first flange 230 and, if included, the first flange 230 and the washer 260, are preferably adjacent to the top 162 of the skimmer basket 160. The purpose of the washer 260 is that it may be desirable to provide a universal basket system 200 that works with a number of different sized skimmer baskets 160 and the washer 260 allows the system 200 to be used with larger skimmer baskets 160 and, in combination with the first flange 230, the washer 260 substantially creates a seal to force water and debris into the slot 210. In some embodiments, the length 233 and width 256 of the first flange 230 (i.e., the diameter of the first flange 230 if the first flange 230 is circular) is at least about 4 inches (e.g., about 4-10 inches) and the length 261 and width 268 of the washer 260 (i.e., the diameter of the washer 260 if the washer 260 is circular) is larger than the length 233 and width 256 of the first flange 230—e.g., about 6 to about 14 inches—so that the washer 260 extends beyond the perimeter of the first flange 230. The first flange 230 and washer 260 can be any suitable shape, including generally circular and generally rectangular, depending on the shape of the basket 160. If included, the washer 260 includes a central opening 262 that is substantially aligned with the bottom hole 217 of the first tube 210 such that water and debris flows through the first slot 221, through the bottom hole 217, through the washer hole 262 and into the skimmer basket interior 167. If included, the washer 260 may be placed above or below the first flange 230. Preferably, the washer 260 is placed below the first flange 230 and the first tube 210 extends below the first flange 230 to assist in the positioning of the washer 260, as best seen in FIGS. 19 and 25, 28. It will be understood that the first flange 230 and washer 260 inhibit but do not necessarily prevent water and debris from entering the basket interior 167 without first entering the slot 221 of the first tube 210 because the first flange 230 and washer 260 may each comprise small fastener apertures 237 and 263 as described below and water and debris may enter the top opening 215 of the first tube 210 if the water level in the skimmer 135 is high, as described above.

The purpose of using the first flange 230 alone or in combination with the washer 260 to inhibit water and debris from entering the basket 160 without first entering the slot 221 of the first tube 210 is that skimmer baskets in the prior art without the system 200 often lack a pump with sufficient force to pull debris and water into the skimmer basket. However, by providing a first tube 210 with the slot 221, the present invention is able to take advantage of the Bernoulli principle, which holds that velocity of water increases when water flows through a narrow constriction. Thus, by constricting the flow of the water and debris into the basket 160 using the first tube slot 221, it has been observed that water and debris flows into the basket 160 at a higher rate than without the system 200. It has also been observed that offsetting the widthwise center 223 of the slot 221 from the widthwise center 136 of the skimmer opening 135 increases the flow of water and the debris into the basket 160 because the offset requires water and debris to travel around the first tube 210, like water drawing in a toilet, before entering the slot 221. For example, if the widthwise center 136 of the skimmer opening 135 is assigned the 6 o'clock position, it has been observed that positioning the widthwise center 223 of the slot 221 at the 2 o'clock position is optimal in pools 110 that have a clockwise drain bias in the skimmer 100. See FIG. 33. It would be deduced that positioning the slot 221 at the 10 o'clock position would be optimal in pools 100 that a have clockwise drain bias in the skimmer 100. Preferably, the widthwise center 223 of the slot 221 is offset from the widthwise center 136 of the skimmer opening 135 by at least about 30 degrees (e.g., about 30 degrees to about 330 degrees—i.e., between the 7 o'clock and 5 o'clock positions if the widthwise center 136 of the skimmer opening 135 is assigned the 6 o'clock position).

Figure 9:
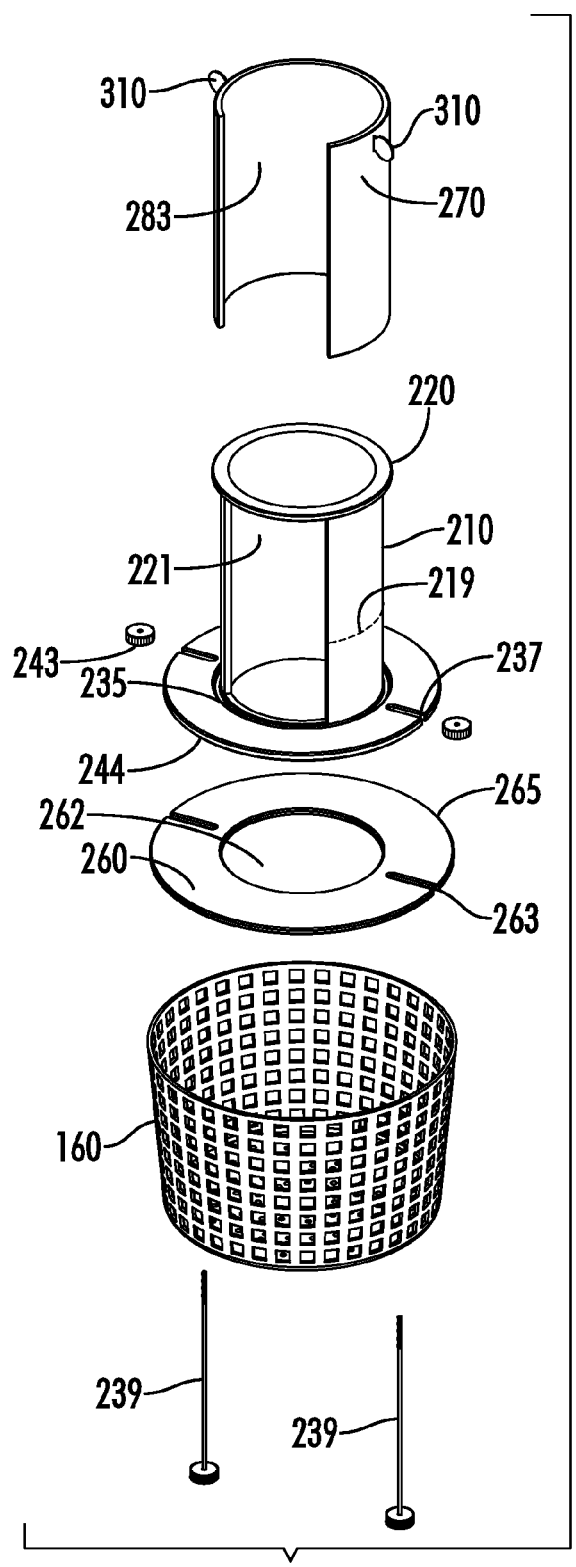
FIG. 9 illustrates a front, perspective, exploded view of a skimmer basket system of another embodiment of the present invention; in this embodiment the first flange of the basket system is removably attached to the basket by a fastener and the system further includes a groove and an upper flange to guide the second tube as it slides around the first tube.
Figure 10:
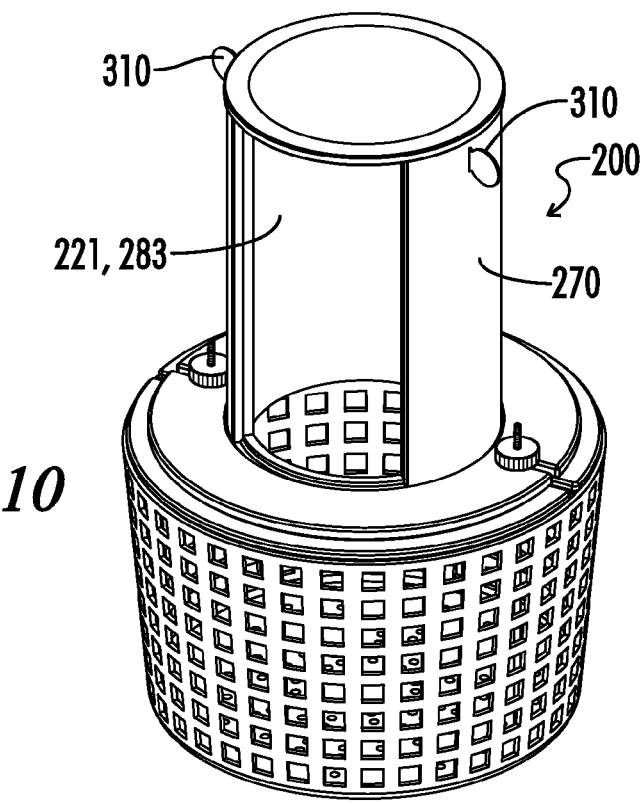
FIG. 10 illustrates a front, perspective view of the assembled basket system of FIG. 9.
Figure 11:
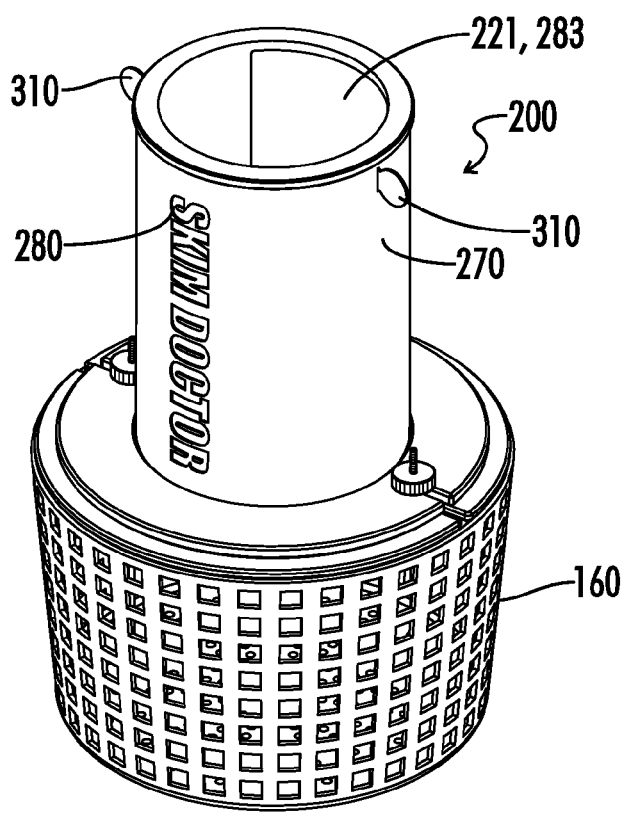
FIG. 11 illustrates a rear, perspective view of the assembled basket system of FIG. 9.
Figure 12:
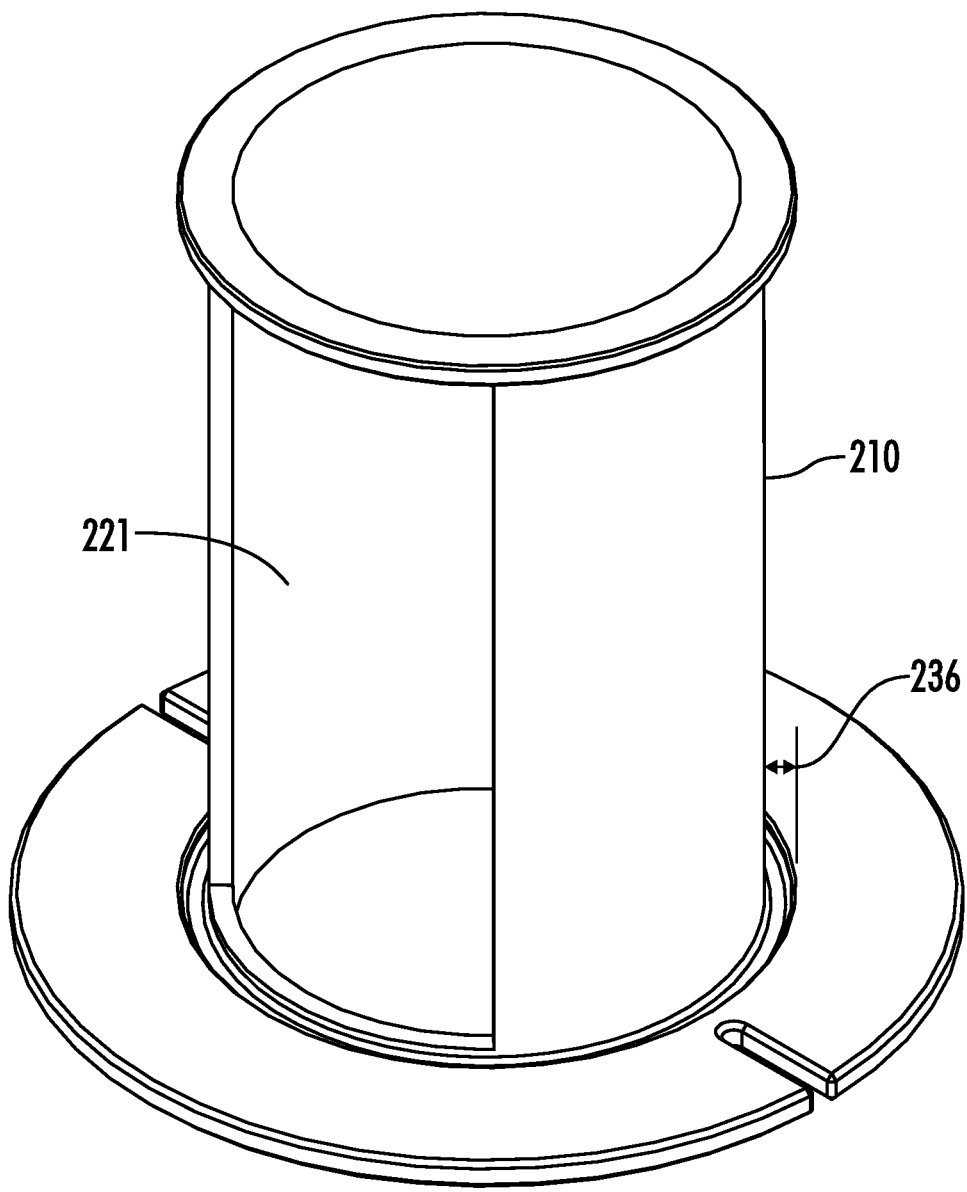
FIG. 12 illustrates a front, perspective view of the first tube of the basket system of FIG. 9.
Figure 15:
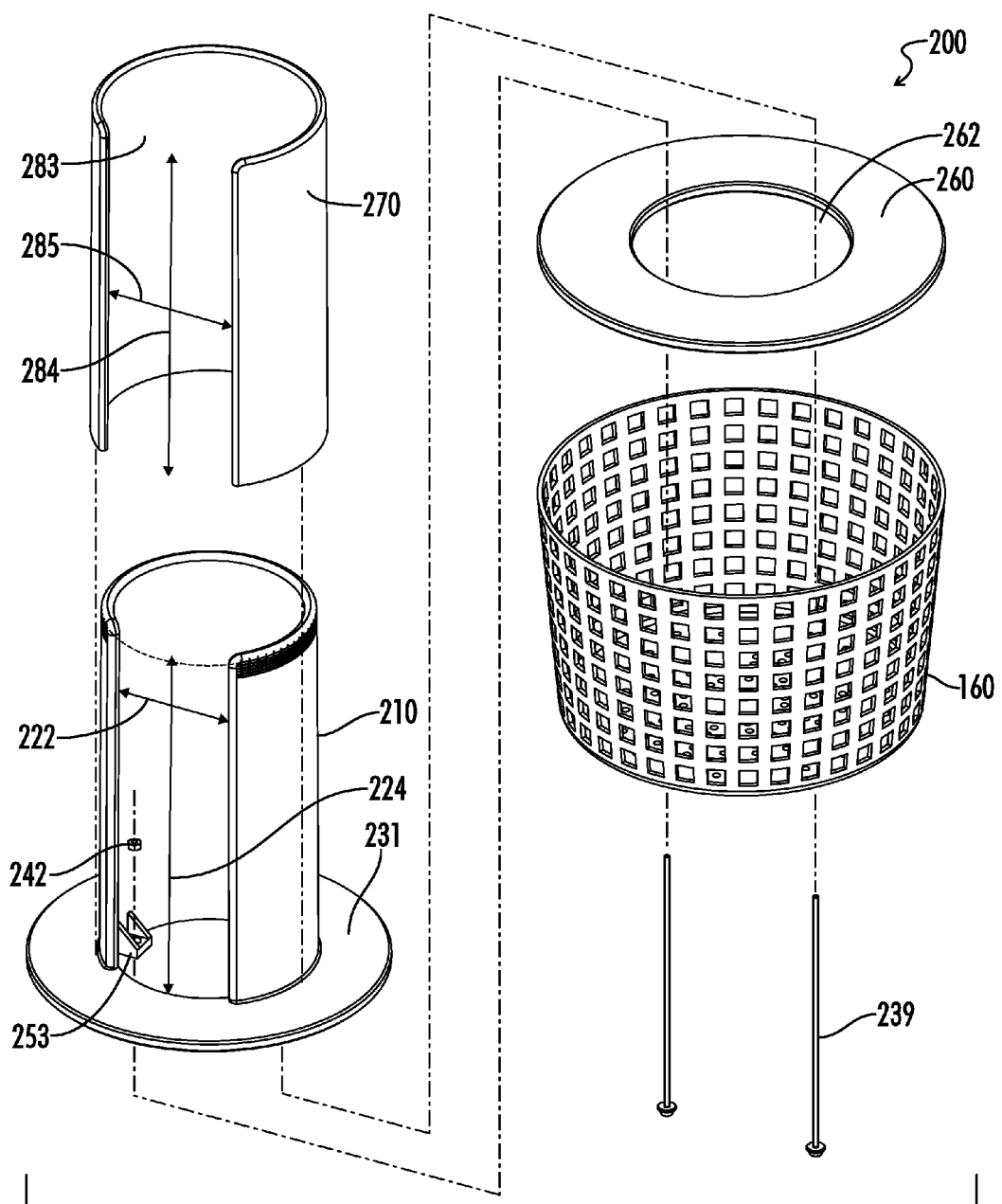
FIG. 15 illustrates a front, perspective, exploded view of a skimmer basket system of another embodiment of the present invention; in this embodiment, the first tube includes two ledges that receive bolts to attach the first tube to the skimmer basket.
Figure 16:
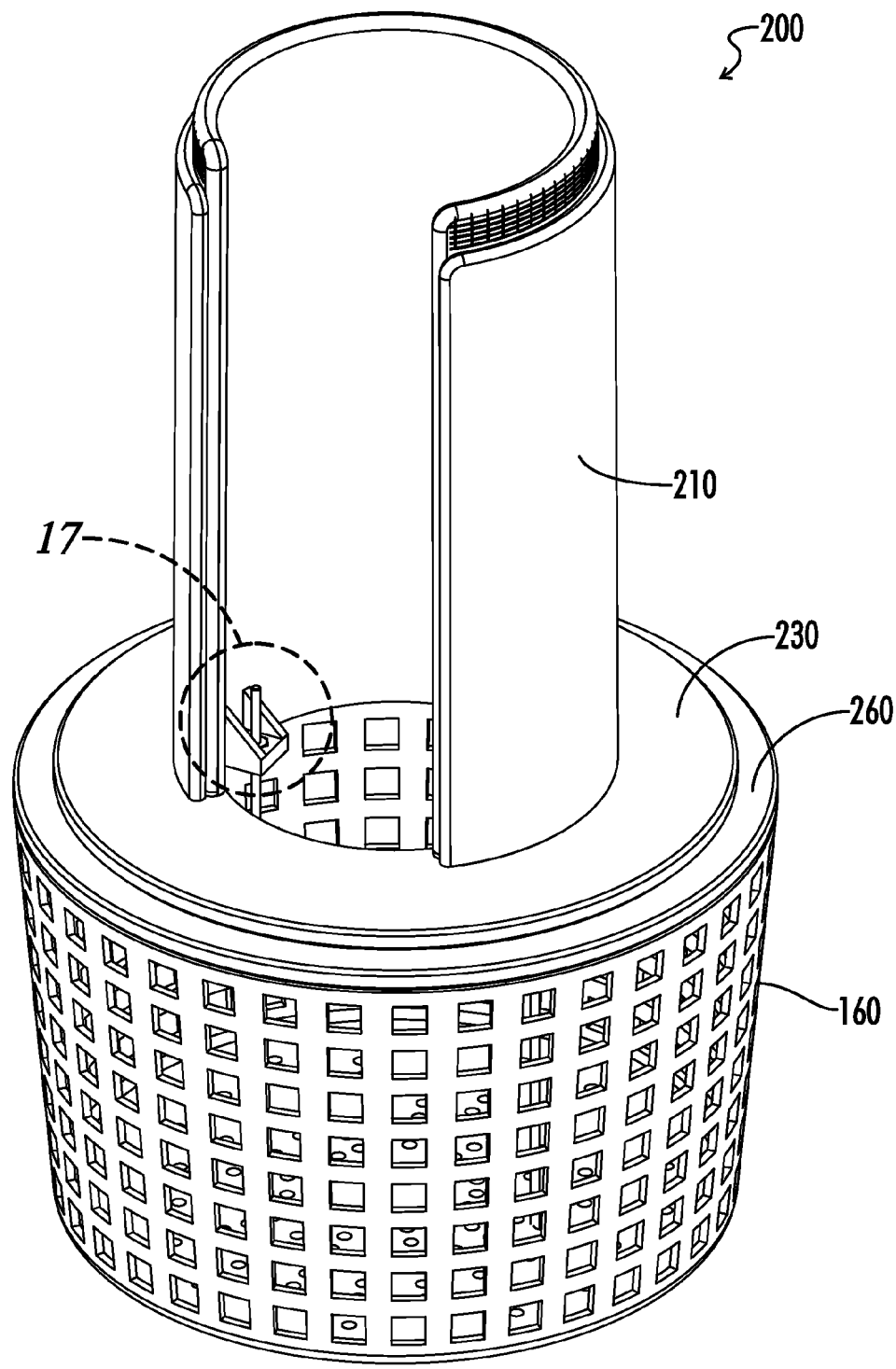
FIG. 16 illustrates a front, perspective view of the assembled skimmer basket system of FIG. 15.
Figure 17:
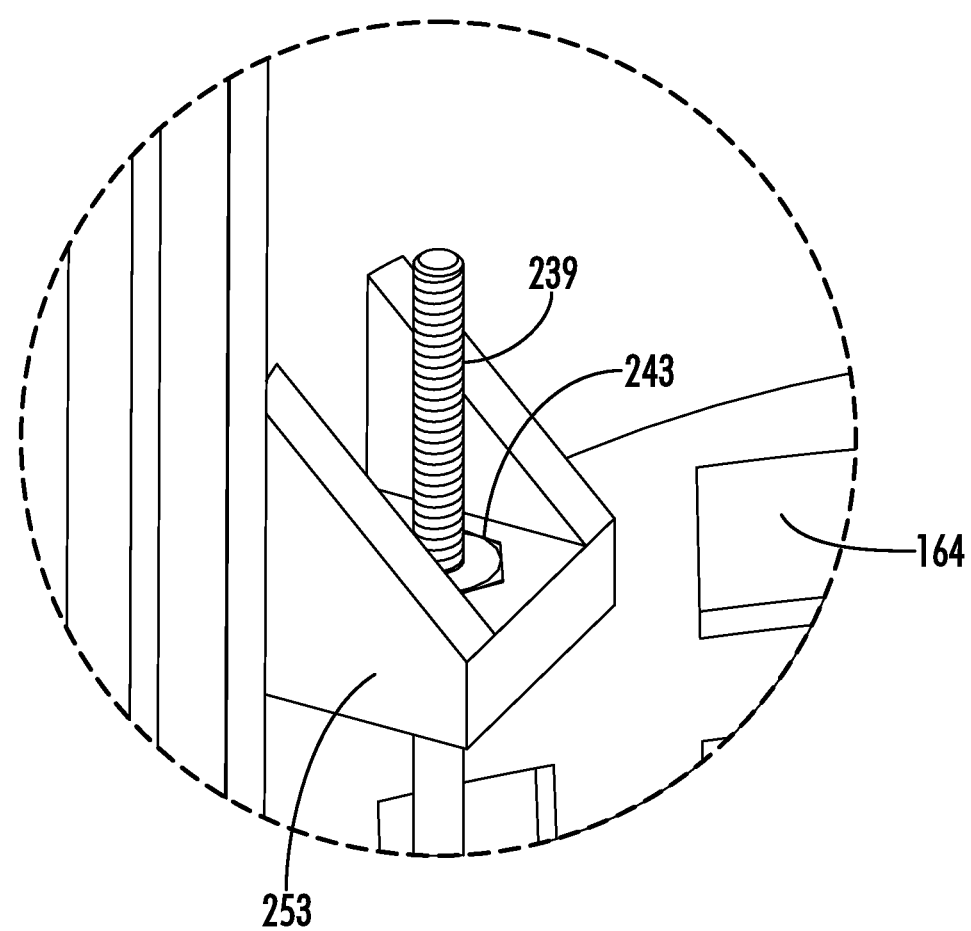
FIG. 17 illustrates a close-up, perspective view of the circled area of FIG. 16.
Figure 18:
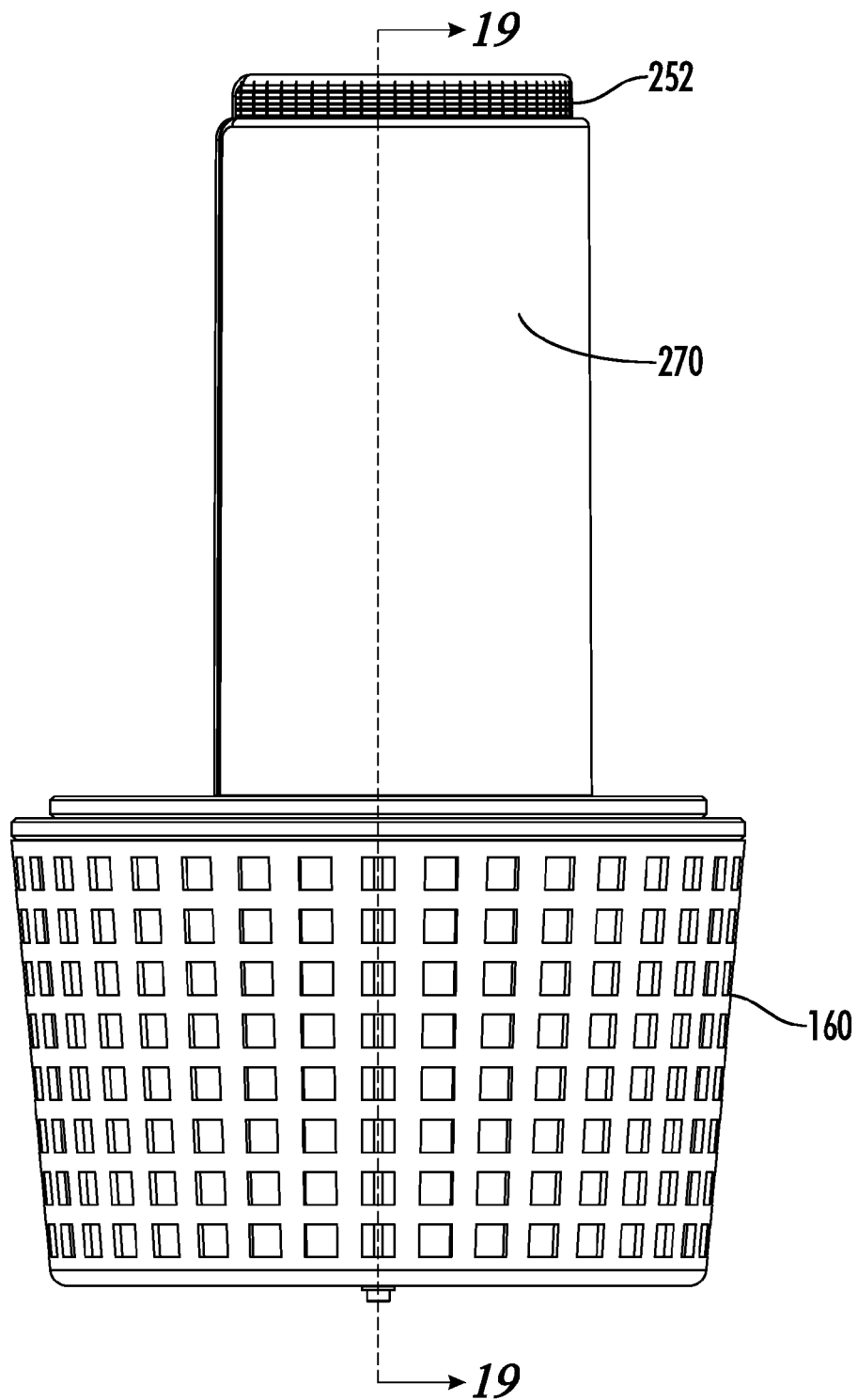
FIG. 18 illustrates a side, elevation view of the assembled basket system of FIG. 16.

The system 200 further includes a door configured to move horizontally and partially cover the first tube longitudinal slot 221. In some embodiments, the door is a second tube 270 adjacent to the first tube 210 and rotatable relative to the first tube 210. The second tube 270 includes a wall 276 that forms the second tube 270, an interior 281, an exterior 282, a top 271, a bottom 274 that includes a bottom opening 273, a second tube height 275 extending from the top 271 to the bottom 274, and a second tube longitudinal slot 283 located between the top 271 and the bottom 274 of the second tube 270. Preferably, the second tube slot 283 has a width 285 perpendicular to the second tube height 275 and a height 284 parallel to the second tube height 275. Preferably, the top 271 includes a top opening 272. A function of the second tube 270 is that the second tube 270 can be rotated relative to the first tube 210 to partially cover the first tube slot 221 to increase the velocity of water and debris flowing into the skimmer basket 160 and another function is that the second tube 270 can be rotated relative to the first tube 210 to close the first tube slot 221 when a user desires to remove the system 200 from the skimmer interior 137 in order to remove debris from the first tube 210 and the skimmer basket 160 (i.e., empty the first tube 210 and the skimmer basket 160). It has been observed that the velocity of water entering skimmer baskets 160 varies depending on pump 190 horsepower and whether the pump 190 has been recently cleaned. Thus, the second tube 270 allows a pool owner to rotate the second tube 270 relative to the first tube 210 to partially cover the first tube slot 221 when the owner has a weak pump 190 and/or a pump system that has not been recently cleaned (so as to increase the velocity of water and debris entering the skimmer basket 160) and to leave the first tube slot 221 uncovered (i.e., leaving the first and second tube slots 221 and 283 aligned, as shown in FIGS. 5, 10, 16, 21, 24, 29, 31 and 34) when the owner has a strong pump 190 and/or a pump system that has been recently cleaned. Preferably, the second tube 271 has one or more apertures 280 opposite the second tube slot 283, which saves material cost, provides flexibility to the second tube 270, and allows the manufacturer to include graphics such as the product's name, as shown in FIG. 11. In some embodiments, the second tube slot 283 has a width 285 of at least about 1 inch (more preferably about 2 to about 5 inches) and a height 284 of at least about 1 inch (more preferably about 4 inches to about 15 inches). Preferably, the second tube slot 283 has the same size and shape as the first tube slot 221. Preferably, the second tube 270 is generally cylindrical and the second tube 270 has an inner diameter 277 (measured as the distance between opposing interior surfaces of the wall 276) and an outer diameter 278 (measured as the distance between opposing exterior surfaces of the wall 276). Preferably, the second tube inner diameter 277 is between 100 and 110% of the size of the first tube outer diameter 254 so that the second tube 270 hugs the first tube 210. In other words, preferably the connection is tight enough so that both tubes 210 and 270 move vertically when a user lifts the system 200 out of the skimmer 100 to empty the basket 160 but the user is able to rotate the second tube 270 relative to the first tube 210 to open and close the slot 221. In some embodiments, the second tube inner diameter 277 and the second tube outer diameter 278 are at least about 2 inches (more preferably, about 3 inches to about 9 inches). Preferably, if the first tube 210 is tapered, as described above, the second tube 270 has a similar taper. The second tube wall 276 may have any desired thickness 286 depending on the strength desired and the cost of the material. In some embodiments, the second tube wall thickness 286 is from about 0.05 inches to about 2 inches. In some embodiments, as shown in FIGS. 9, 10, and 12, the top surface 231 of the first flange 230 includes a groove 235 that extends around a perimeter 219 of the first tube 210 (more particularly, the circumference of the first tube 210 if the first tube 210 is cylindrical) to create a track for the second tube 270. In some embodiments, the width 236 of the first flange groove 235 is from about 100% to about 120% of the second tube wall thickness 286 so that the bottom 274 of the second tube 270 fits snugly in the groove 235. In some embodiments, as shown in FIGS. 10, 11, 13 and 14, the first tube 210 includes an upper flange 220 and the second tube is located between the first flange 230 and the upper flange 220. In such embodiments, the first tube height 218 is greater than the second tube height 275. Optionally, the second tube 270 includes a plurality of protrusions/ears 310 located at the top of the second tube 270 to make it easier for a user to rotate the second tube 270.

In some embodiments, the first tube 210 is located inside the second tube interior 281, as shown in FIGS. 5, 7, 8, 10, 11, 13, 14, 16, 18, 19, 21, 22, 24, 27, 28, 29, and 31-34. In such embodiments, the inner diameter 255 of the first tube 210 is different than the inner diameter 277 of the second tube 270 and the outer diameter 254 of the first tube 210 is different than the outer diameter 278 of the second tube 270. Preferably, the first tube interior 212 is hollow. In other embodiments, the second tube 270 is located in the first tube interior 212.

Preferably, the first tube 210, the second tube 270, the washer 260 and the first flange 230 are comprised of plastic.

Figure 34:
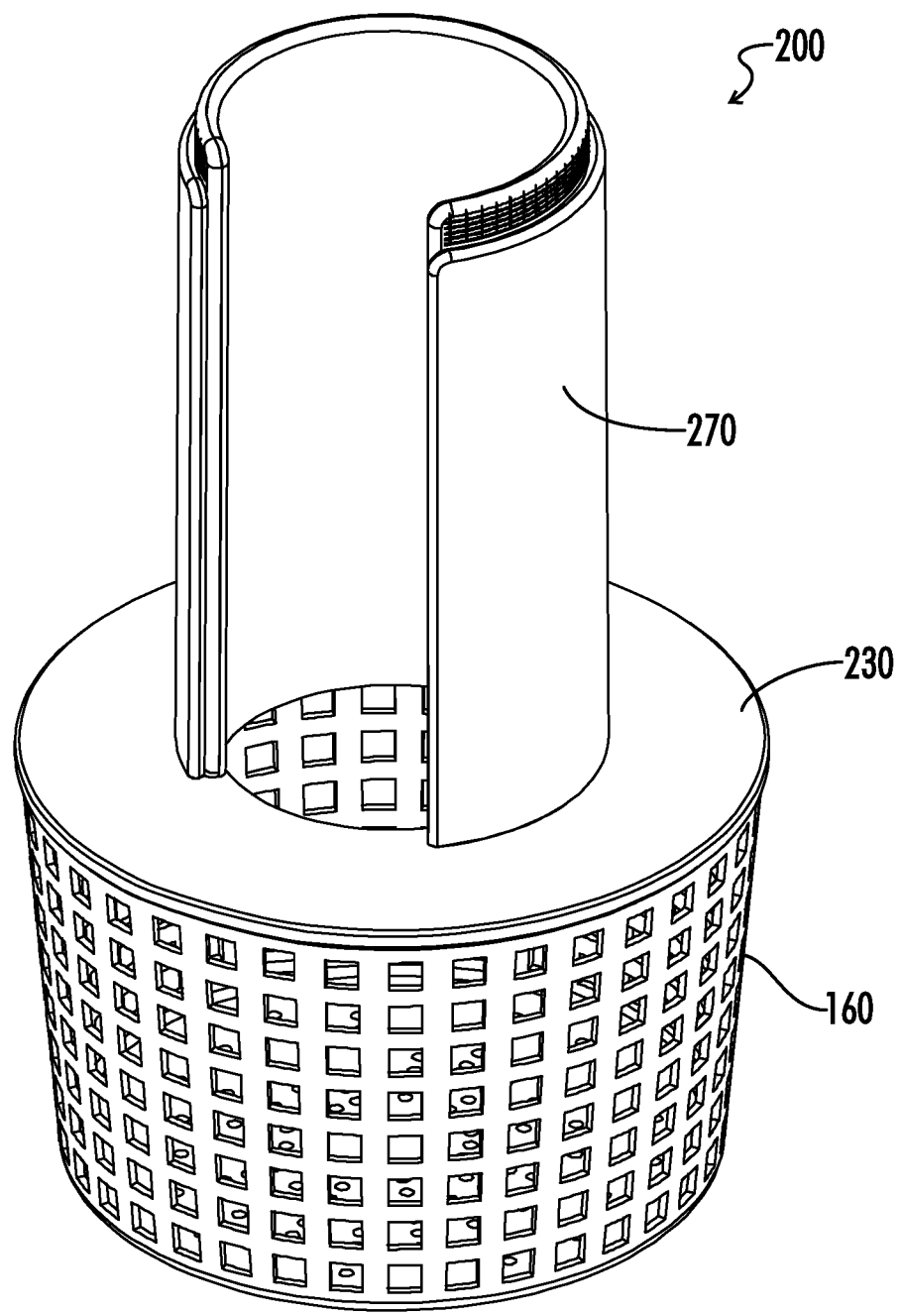
FIG. 34 illustrates a front, perspective view of a skimmer basket system of another embodiment of the present invention; in this embodiment, the basket, first flange, and first and second tubes are a single piece.

In some embodiments, the first flange 230 and the skimmer basket 160 are permanently attached to one another and the first and second tubes 210 and 270, first flange 230, and skimmer basket 160 are a single piece of plastic, as shown in FIG. 34.

Figure 20:
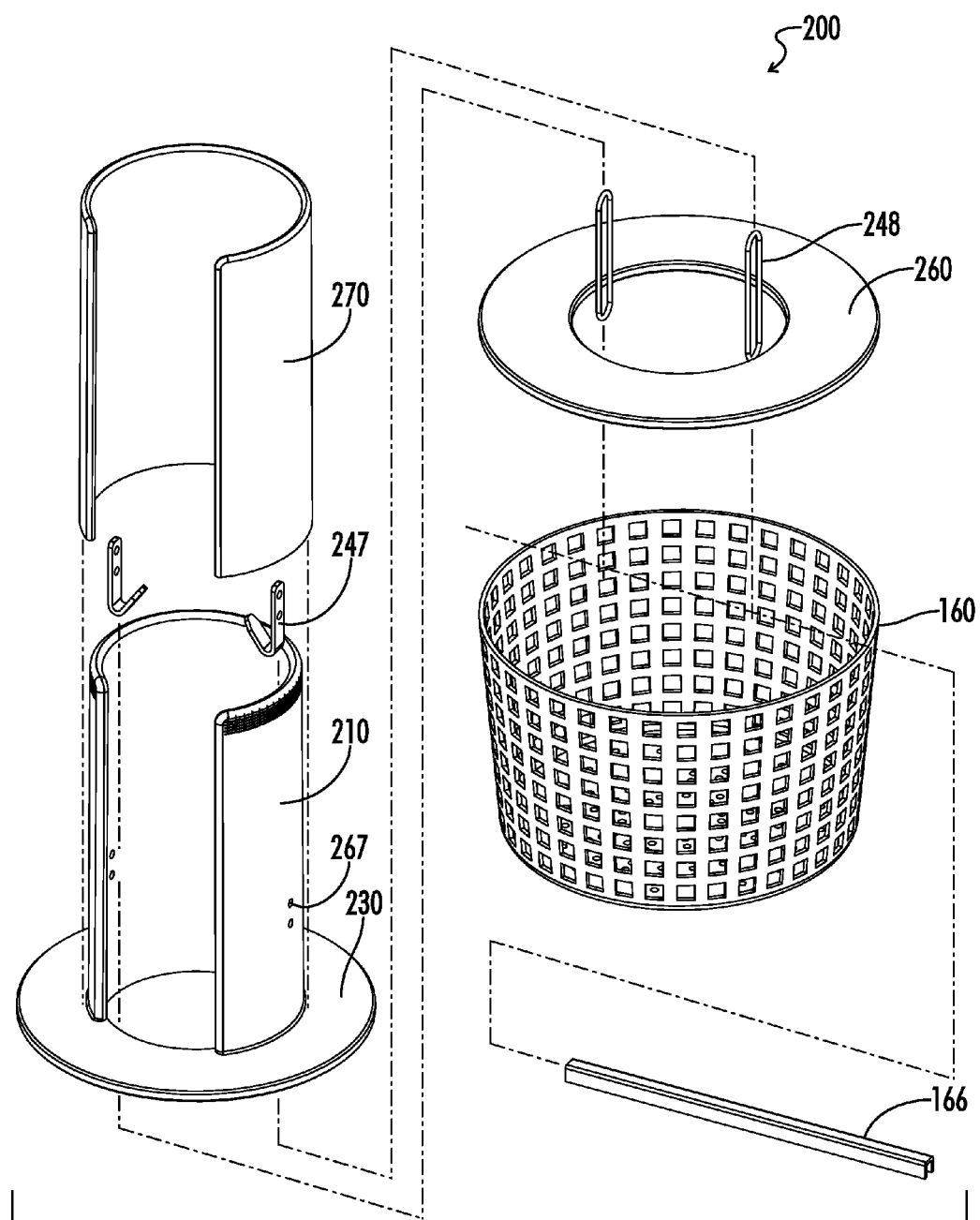
FIG. 20 illustrates a front, perspective, exploded view of a skimmer basket system of another embodiment of the present invention; in this embodiment, the first tube includes two posts that receive O-rings to attach the first tube to the skimmer basket handle.
Figure 21:
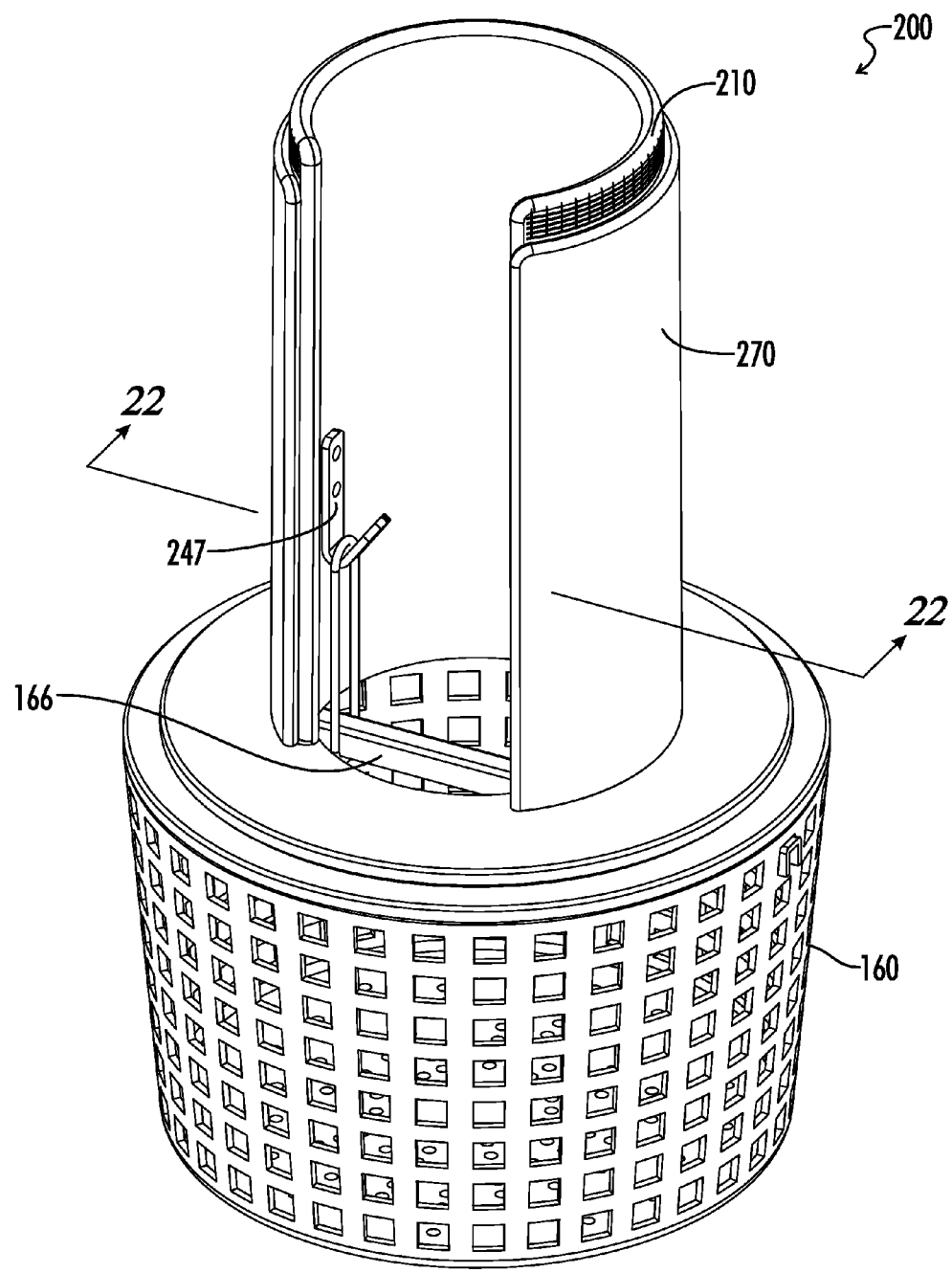
FIG. 21 illustrates a front, perspective view of the assembled basket system of FIG. 20.
Figure 22:
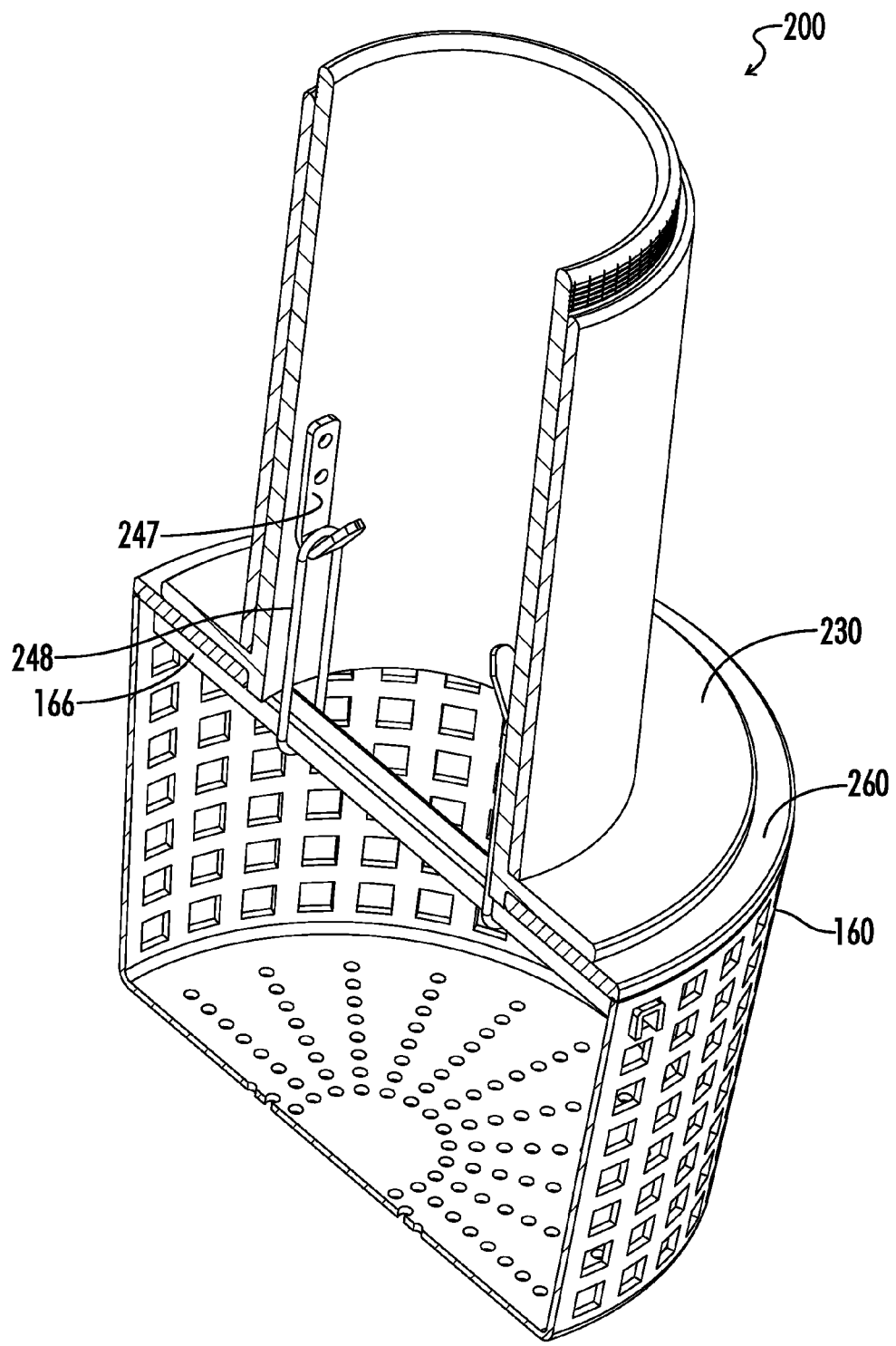
FIG. 22 illustrates a section view of the basket system of FIG. 21, taken along line 22-22.
Figure 23:
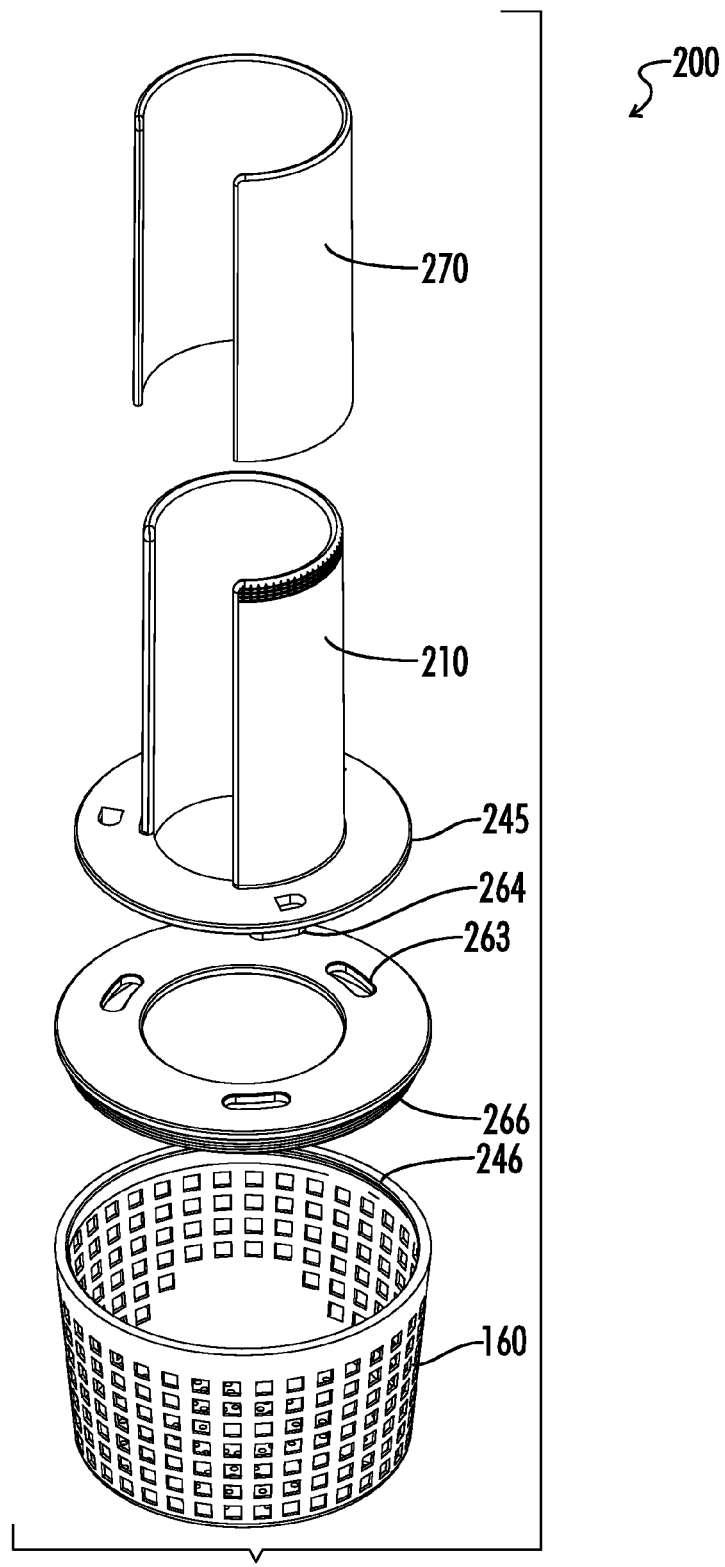
FIG. 23 illustrates a front, perspective, exploded view of a skimmer basket system of another embodiment of the present invention; in this embodiment, the first flange includes male threads that mate with female threads on the interior of the skimmer basket.
Figure 24:
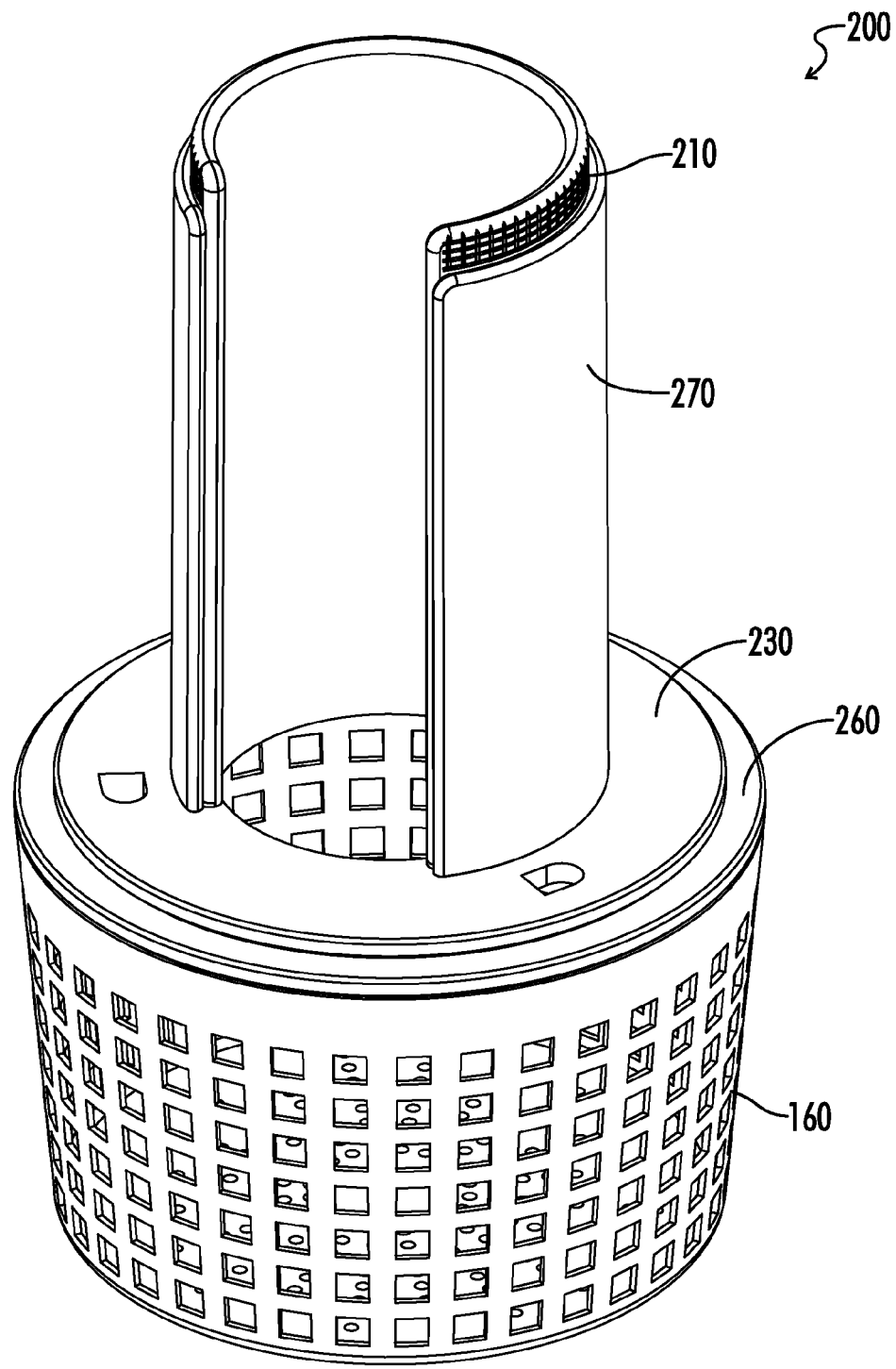
FIG. 24 illustrates a front, perspective view of the assembled basket system of FIG. 23.

In other embodiments, the first flange 230 and the skimmer basket 160 are mechanically attached to one another. For example, the system 200 may include two hinge pins 250 and two hinges 249 so that the basket 160 can pivot relative to the first flange 230 upon removal of one of the hinge pins 250, as shown in FIGS. 26-33. In other embodiments, as shown in FIGS. 23-25, the first flange 230 and the inner rim of the basket 160 include mating threads 245 and 246 so that the first flange 230 can removably attach to the basket 160. In such embodiments, the washer 260 may include threads 266 that mate with threads 246 located in the inner rim of the basket 160 and the bottom surface 232 of the first flange 230 may include one or more protrusions 264 that mate with and lock into apertures 263 in the washer 260 so that the washer 260 is removably attached to the first flange 230. In some embodiments, the first flange 230 and the skimmer basket 160 may be removably attached by a fastener 238. In some such embodiments, as shown in FIGS. 4-19, the fastener 238 includes a series of bolts 239, washers 242, and nuts 243. In some embodiments, the bolt 239 includes threads 240 and the bolt 239 passes through the apertures 164 located in the floor 161 of the basket 160. Preferably, the bolt 239 has a length 241 of at least 3 inches (e.g., about 3 to about 12 inches). Preferably, the top end 257 of the bolt 239 passes through one or more fastener apertures 237 located in the first flange 230 and one or more fastener apertures 263 located in the washer 260. Preferably, the washer fastener apertures 263 substantially extend to the outer edge 265 of the washer 260 and the first flange fastener apertures 237 substantially extend to the outer edge 244 of the first flange 230 which makes the system 200 easy to assemble. Alternatively, instead of a bolt 239, the system 200 may include a threaded rod that has a nut 243 and washer 242 at each end. In other embodiments, the interior 212 of the first tube 210 includes a ledge 253 and the top end 257 of the bolt 239 passes through an aperture located in the ledge 253, as seen in FIGS. 15-19. It has been observed that a stainless steel threaded rod or bolt 239 having 4-40 thread is particularly well-suited for use with the present system 200. In other embodiments, instead of a bolt 239 or threaded rod, the fastener 218 may be an O-ring 248 that attaches to a post 247 located in the first tube interior 212, as shown in FIGS. 20-22.

Preferably the system 200 is used in a method of increasing the velocity of water flowing into a skimmer basket 160 that includes providing the system 200, placing the basket 160 in the well 198 of a skimmer 100, and flowing water and debris through the slot 221 of the first tube 210 and into the skimmer basket 160. Optionally, the method further includes rotating the second tube 270 relative to the first tube 210. Optionally, the method further includes the step of rotating the second tube 270 relative to the first tube 210 so that the second tube 270 partially covers the first tube slot 221, and this rotation of the second tube 270 relative to the first tube 210 so that the second tube 270 partially covers the first tube slot 221 increases the velocity of water and debris entering the basket 160.

Figure 35:
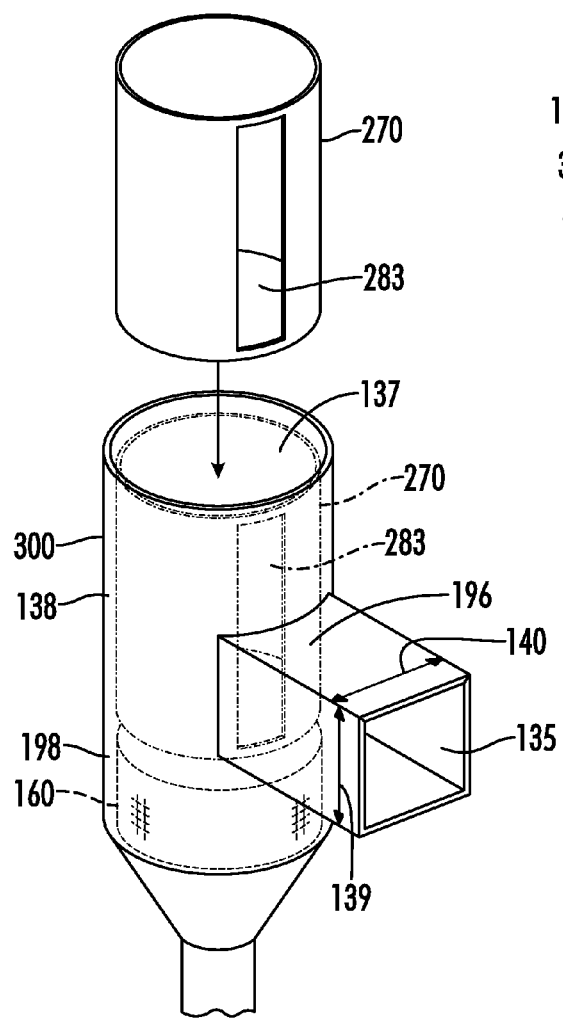
FIG. 35 illustrates a front, perspective view of a skimmer that includes a tube that is configured to rotate within the skimmer so as to at least partially cover the water passageway.

In some embodiments, as shown in FIG. 35, the system 200 does not include a discrete first tube 210 but instead the housing 300 of the skimmer 100 acts as the first tube 210. More particularly, as shown in FIG. 35, the system 200 includes a pool skimmer 100 that has a skimmer interior 137, a skimmer exterior 138, a skimmer opening 135 leading from the skimmer exterior 138 to the skimmer interior 137, a skimmer basket 160 located in a well 198 of the skimmer interior 137, and a water passageway 196 leading from the skimmer opening 135 to the skimmer basket well 198, the water passageway 196 having a height 139 and a width 140, a second tube 270 located above the skimmer basket 160, the second tube 270 comprising a top 271, a bottom 274 comprising an opening 273, a second tube height 275 extending from the bottom 274 to the top 271, an interior 281, an exterior 282, and a second tube slot 283 configured to feed water from the second tube exterior 282 to the second tube interior 281 and the basket interior 167, the second tube slot 283 located between the top 271 and the bottom 274 of the second tube 270, the second tube slot 283 having a width 285 perpendicular to the second tube height 275 and a height 284 parallel to the second tube height 275, the second tube 270 adjacent to the water passageway 196, the second tube 270 configured to rotate relative to the water passageway 196 and at least partially cover the water passageway 196. Optionally, the skimmer 100 further includes a weir 170.

Figure 36:
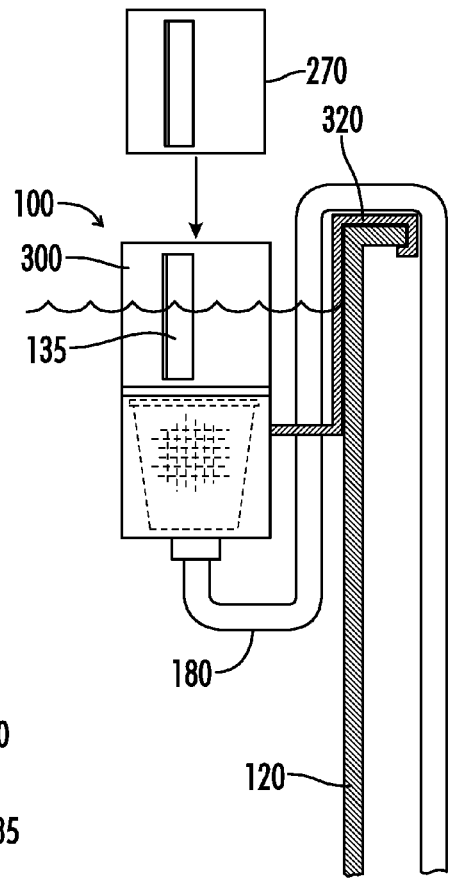
FIG. 36 illustrates a side view of a skimmer that is attached to the sidewall of a swimming pool; the skimmer has a longitudinal slot in the housing and the skimmer interior has a tube that is configured to rotate to partially cover the longitudinal slot.

FIG. 36 shows a variation of the system of FIG. 35. In FIG. 36, the skimmer 100 is attached to the pool wall 120 via an arm 320, and a pipe 180 feeds water that is filtered by the skimmer basket 160 to the pump 190. In such an embodiment, the water passageway 196 and the skimmer opening 135 are the same—meaning that there is no channel between the basket well 198 and skimmer opening 135. Skimmers 100 attached to the pool sidewall 120 are known in the art and include the INTEX Deluxe Wall Mount Swimming Pool Surface Skimmer. However, it is believed that previously known wall-mounted skimmers lack a slot 135 to increase the velocity of water entering the basket 160 as well as a door (in this case second tube 270) which can be used to partially cover the slot 135 to further increase the flow of water entering basket 160.

Terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention, as defined and limited solely by the following claims.

What is claimed is:

1. A system for improving the operation of a pool skimmer, the system comprising:
   a skimmer basket, the skimmer basket configured to be placed in a pool skimmer and comprising a basket interior, a basket exterior, a floor, a top, a height extending from the floor to the top, a sidewall extending upwardly from the floor, and a plurality of apertures located in at least one of the basket sidewall and the floor, wherein the basket floor and the basket sidewall separate the basket interior from the basket exterior;
   a first tube attached to the skimmer basket, the first tube comprising a top, a bottom comprising an opening, a first tube height extending from the bottom to the top, an interior, an exterior comprising a first flange extending from the first tube towards the basket sidewall, and a first tube slot configured to feed water from the first tube exterior to the first tube interior and the basket interior, the first tube slot located between the top and the bottom of the first tube, the first tube slot having a width perpendicular to the first tube height and a height parallel to the first tube height; and
   a second tube adjacent to the first tube, the second tube configured to rotate relative to the first tube and at least partially cover the first tube slot, the second tube comprising a top, a bottom, a second tube height extending from the bottom to the top, and a second tube slot located between the top and the bottom of the second tube, the second tube slot having a width perpendicular to the second tube height and a height parallel to the second tube height.

2. The system of claim 1, wherein the tops of the first and second tubes each comprise openings.

3. The system of claim 1, wherein the first tube is located inside the second tube interior.

4. The system of claim 1 further comprising a pool, the pool comprising a sidewall, the pool sidewall comprising a pool skimmer, the pool skimmer comprising a skimmer interior and a skimmer opening leading from the pool to the skimmer interior and further wherein the basket is located in the skimmer interior.

5. The system of claim 4, wherein a widthwise center of the first tube slot is offset from a widthwise center of the skimmer opening by at least about 30 degrees.

6. The system of claim 1, wherein the first flange and the skimmer basket are permanently attached to each other.

7. The system of claim 1, wherein the first flange and the skimmer basket are mechanically attached to each other.

8. The skimmer basket of claim 1, wherein the first flange is pivotally attached to the skimmer basket by a hinge.

9. The system of claim 1, wherein the first flange is removably attached to the skimmer basket by a fastener.

10. The system of claim 9, wherein the fastener is at least about 3 inches in length and comprises threads.

11. The system of claim 9, wherein the first flange comprises a flange fastener aperture and the fastener passes through the flange fastener aperture.

12. The system of claim 11, wherein the first fastener aperture substantially extends to an outer edge of the first flange.

13. The system of claim 9, wherein the fastener passes through an aperture in the basket.

14. The system of claim 1, wherein the first flange and the basket comprise mating threads for removably attaching the first flange to the basket.

15. The system of claim 1, wherein the width of the first tube slot is at least about 1 inch, the width of the second tube slot is at least about 1 inch, the height of the first tube slot is at least about 4 inches and the height of the second tube slot is at least about 4 inches.

16. The system of claim 1, wherein the first tube and the second tube are generally cylindrical.

17. The system of claim 1, wherein the first tube height is greater than the second tube height, wherein the second tube is located above the first flange and further wherein the first tube comprises an upper flange extending about a perimeter of the first tube, the upper flange located above the first flange and the second tube.

18. The system of claim 1, wherein the first flange comprises a groove adjacent to the first tube and extending about a perimeter of the first tube, further wherein the bottom of the second tube is located in the groove.

19. The system of claim 1, wherein the first tube slot comprises a top and a bottom, and the bottom of the first tube slot is adjacent to a top of the first flange.

20. The system of claim 1, wherein the system further comprises a washer attached to the first flange, the washer comprising a washer opening in fluid communication with the first tube bottom aperture.

21. The system of claim 20, wherein the washer comprises a washer fastener aperture configured to receive a fastener and further wherein the washer extends beyond a perimeter of the first flange.

22. A method of increasing the velocity of water flowing into a skimmer basket, the method comprising the steps of:
   providing the basket system of claim 1; and
   flowing water through the slot of the first tube and into the skimmer basket interior.

23. The method of claim 22 further comprising the step of rotating the second tube relative to the first tube.

24. The method of claim 22 further comprising the step of rotating the second tube relative to the first tube so that the second tube partially covers the first tube slot, and further wherein rotation of the second tube relative to the first tube so that the second tube partially covers the first tube slot increases the velocity of water entering the basket interior.

25. A kit for increasing the velocity of water flowing into a skimmer basket, the kit comprising:
   a first tube, the first tube comprising a top, a bottom comprising an opening, a height extending from the bottom to the top, an interior, an exterior, an inner diameter perpendicular to said height, an outer diameter perpendicular to said height, a first tube slot having a width of at least about 1 inch and a height of at least about 4 inches, the first tube slot width parallel to the inner and outer diameters of the first tube, the first tube slot height perpendicular to the inner and outer diameters of the first tube, the first tube exterior comprising a first flange extending from the first tube, the first flange configured to attach to a skimmer basket, at least one of the first tube and the first flange comprising a plurality of fastener apertures for attaching the first tube to a skimmer basket; and
   a second tube, the second tube comprising a top, a bottom comprising a bottom opening, a height extending from the bottom to the top, an interior, an exterior, an inner diameter perpendicular to said height, an outer diameter perpendicular to said height, and a second tube slot having a width of at least about 1 inch and a height of at least about 4 inches, the second tube slot width parallel to the inner and outer diameters of the second tube, the second tube slot height perpendicular to the inner and outer diameters of the second tube.

26. The kit of claim 25 wherein the inner diameter of the second tube is between about 100% and about 120% of the size of the outer diameter of the first tube.

27. The kit of claim 25 wherein the first flange comprises a groove adjacent to the first tube and extending about an outer circumference of the first tube.

28. The kit of claim 25 further comprising an upper flange extending about an outer circumference of the first tube.

29. The kit of claim 25, wherein the first tube is located between the fastener apertures.

30. A pool skimmer system comprising:
- a pool skimmer, the pool skimmer comprising a skimmer interior, a skimmer exterior, and a skimmer opening leading from the skimmer exterior to the skimmer interior;
- a skimmer basket disposed in the skimmer interior, the skimmer basket comprising a basket interior, a basket exterior, a floor, a top, a height extending from the floor to the top, a sidewall extending upwardly from the floor, and at least one aperture located in at least one of the basket sidewall and the floor, wherein the basket floor and the basket sidewall separate the basket interior from the basket exterior;
- a first tube located above the skimmer basket, the first tube comprising a top, a bottom comprising an opening, a first tube height extending from the bottom to the top, an interior, an exterior, and a first tube slot configured to feed water from the first tube exterior to the first tube interior and the basket interior, the first tube slot located between the top and the bottom of the first tube, the first tube slot having a width perpendicular to the first tube height and a height parallel to the first tube height; and
- a door adjacent to the first tube, the door configured to move horizontally relative to the first tube and at least partially cover the first tube slot.

* * * * *